US010460297B2

(12) United States Patent
Pinski

(10) Patent No.: US 10,460,297 B2
(45) Date of Patent: Oct. 29, 2019

(54) SYSTEM AND METHOD FOR INTELLIGENTLY INTERFACING WITH FINANCIAL INFORMATION

(71) Applicant: Capital One Services, LLC, McLean, VA (US)

(72) Inventor: David Pinski, Narberth, PA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 13/633,642

(22) Filed: Oct. 2, 2012

(65) Prior Publication Data

US 2014/0095380 A1 Apr. 3, 2014

(51) Int. Cl.
| | |
|---|---|
| *G06Q 40/00* | (2012.01) |
| *G06Q 20/08* | (2012.01) |
| *G06F 3/0484* | (2013.01) |
| *G06Q 20/10* | (2012.01) |
| *G06F 3/0488* | (2013.01) |
| *G06F 3/0481* | (2013.01) |

(52) U.S. Cl.
CPC ........... *G06Q 20/08* (2013.01); *G06F 3/0481* (2013.01); *G06F 3/0488* (2013.01); *G06F 3/04842* (2013.01); *G06Q 20/10* (2013.01); *G06Q 20/102* (2013.01)

(58) Field of Classification Search
CPC ............................ G06Q 30/0641; G06Q 20/08
USPC .......................................................... 705/37
See application file for complete search history.

(56) References Cited

U.S. PATENT DOCUMENTS

| | | | |
|---|---|---|---|
| 5,195,130 A * | 3/1993 | Weiss et al. | 379/93.19 |
| 7,792,748 B1 | 9/2010 | Ebersole et al. | |
| 2003/0020731 A1* | 1/2003 | Kato | G06F 3/0481 345/619 |
| 2007/0168275 A1* | 7/2007 | Busby | G06Q 40/04 705/37 |

OTHER PUBLICATIONS

Computers, Networks and Communications; "Shop MA, Inc; Patent Issued for Method, System, and Computer Readable Medium for Rule-Based Multi-Selection Gifting"; Atlanta; Dec. 13, 2012 (Year: 2012).*
U.S. Appl. No. 12/875,318, filed Sep. 3, 2010, Ebersole et al.

* cited by examiner

*Primary Examiner* — Edward Chang
(74) *Attorney, Agent, or Firm* — Troutman Sanders LLP; Christopher J. Forstner; John A. Morrissett

(57) ABSTRACT

A system and method for interfacing with financial information. The system includes a touch screen display. The touch-screen display includes a plurality of logical regions. Each one of the plurality of logical regions includes content that is expandable based on a user selection. The system also includes logic to associate a plurality of a user's financial data of a predetermined type with each one of the logical regions. The system further includes logic to vary an amount of the associated financial data displayed on the display based on a first type of user selection of one of the logical regions.

24 Claims, 20 Drawing Sheets

SYSTEM AND METHOD FOR INTELLIGENTLY INTERFACING WITH FINANCIAL INFORMATION

BACKGROUND

Interfacing with financial information, and initiating transactions with financial information, over the Internet has increased exponentially over the past few years. Financial services provided at brick and mortar banking facilities is becoming more and more obsolete. Mobile devices such as cellular phones, Personal Digital Assistants (PDAs), tablets, and other wirelessly enabled devices have successfully penetrated and been adopted by the general consumer market. Individuals have come to enjoy the convenience, flexibility and mobility of wireless devices as a means to facilitate communications and interact with friends, family, colleagues and business entities.

In the case of Internet-based information interfaces, and initiating transactions over the Internet, conventional hierarchical navigation interfaces can be cumbersome and require a certain degree of learning and experience development on the part of a user of such an interface. Conventional hierarchical menu-based navigational interfaces were introduced to computers as a method of organizing data, such as mainframe data upon which the interface was based. A conventional service provider web site can include a login page, then after a successful login, a user is directed to a web page showing a list of available services. To move from a login screen, to a service browsing screen, or a transaction screen, requires passing through several web pages. If a service is selected, the webpage reloads with details. To switch to a different service, the user must go back through a series of pages that they previously navigated, or in some cases, jump back to a service provider list from a drop-down menu and navigate to a desired service. These conventional methods can be cumbersome and can provide a user with a non-intuitive user interface.

Thus, there remains a need to overcome conventional limitations and provide a system and method to intelligently interface with information, including financial information, and execute financial transaction requests, over the Internet.

SUMMARY

The present disclosure is directed generally to systems and methods for intelligently interfacing with financial information. One embodiment of the present subject matter provides a system of interfacing with financial information including a touch-screen display. The touch screen display can include a plurality of logical regions. Each one of the plurality of logical regions includes content that is expandable based on a user selection. The system can include logic to associate a plurality of a user's financial data of a predetermined type with each one of the logical regions. The system can also include logic to vary an amount of the associated financial data displayed on the display based on a first type of user selection of one of the logical regions.

Another embodiment of the present subject matter provides a system of interfacing with financial information including a touch-screen display. The touch screen display can include a plurality of logical regions. Each one of the plurality of logical regions includes content that is expandable based on a user selection. The system can include a computer processor having a computer readable storage medium. The computer readable storage medium can include instructions stored therein for executing on the computer processor. The instructions when read and executed on the computer processor can cause the computer processor to associate a plurality of a user's financial data of a predetermined type with each one of the logical regions and to vary an amount of the associated financial data displayed on the display based on a first type of user selection of one of the logical regions.

Another embodiment of the present subject matter provides a method of executing a financial transaction request. The method can include associating a plurality of a user's financial data of a first predetermined type with a first logical region on a touch screen display and associating a plurality of a user's financial data of a second predetermined type with a second logical region on the touch screen display. The method can also include receiving a user selection of at least a portion of the user's financial data in each of the first and second logical regions. The at least a portion of the user's financial data of the first logical region can be associated with the at least a portion of the user's financial data of the second logical region based on the received user selection. A financial transaction can be initiated based on the received user selection and using the associated respective portions of the user's financial data of the first and second logical regions.

Another embodiment of the present subject matter provides a system of executing a financial request including a touch-screen display. The touch screen display can include a plurality of logical regions. Each one of the plurality of logical regions can include content that is expandable based on a user selection. The system can include a computer processor having a computer readable storage medium. The computer readable storage medium can include instructions stored therein for executing on the computer processor. The instructions when read and executed on the computer processor can cause the computer processor to associate a plurality of a user's financial data of a first predetermined type with a first logical region on the touch screen display and associate a plurality of a user's financial data of a second predetermined type with a second logical region on the touch screen display. The instructions when read and executed on the computer processor can also cause the computer processor to receive a user selection of at least a portion of the user's financial data in each of the first and second logical regions, associate the at least a portion of the user's financial data of the first logical region with the at least a portion of the user's financial data of the second logical region based on the received user selection and initiate a financial transaction based on the received user selection and using the associated respective portions of the user's financial data of the first and second logical regions.

A further embodiment of the present subject matter provides a method of executing a financial transaction request. The method can include associating a plurality of a user's financial data of a first predetermined type with a first logical region on a touch screen display and associating a plurality of a user's financial data of a second predetermined type with a second logical region on the touch screen display. The method can also include associating a first subset of the data of the first predetermined type with a first logical subregion in the first logical region and associating a second subset of the data of the first predetermined type with a second logical subregion in the first logical region. A user selection of at least a portion of the data in each of the first and second logical subregions can be received. The method can include associating the at least a portion of the data of the first logical subregion with the at least a portion of the data of the second logical subregion based on the received user selection. A financial transaction can be initiated based on the received user selection and using the associated respective portions of the data of the first and second logical subregions.

An additional embodiment of the present subject matter provides a system of executing a financial request including a touch-screen display. The touch screen display can include a plurality of logical regions. Each one of the plurality of logical regions can include content that is expandable based on a user selection. A first logical region can include a plurality of logical subregions. Each one of the logical subregions can include content that is expandable based on a user selection. The system can include a computer processor having a computer readable storage medium. The computer readable storage medium can include instructions stored therein for executing on the computer processor. The instructions when read and executed on the computer processor can cause the computer processor to associate a plurality of a user's financial data of a first predetermined type with a first logical region on the touch screen display and associate a plurality of a user's financial data of a second predetermined type with a second logical region on the touch screen display. The instructions when read and executed on the computer processor can also cause the computer processor to associate a first subset of the data of the first predetermined type with a first logical subregion in the first logical region and associate a second subset of the data of the first predetermined type with a second logical subregion in the first logical region. The instructions when read and executed on the computer processor can also cause the computer processor to receive a user selection of at least a portion of the data in each of the first and second logical subregions, to associate the at least a portion of the data of the first logical subregion with the at least a portion of the data of the second logical subregion based on the received user selection, and to initiate a financial transaction based on the received user selection and using the associated respective portions of the data of the first and second logical subregions.

These embodiments and many other objects and advantages thereof will be readily apparent to one skilled in the art to which the invention pertains from a perusal of the claims, the appended drawings, and the following detailed description of the embodiments.

BRIEF DESCRIPTION OF THE DRAWINGS

Various aspects of the present disclosure will be or become apparent to one with skill in the art by reference to the following detailed description when considered in connection with the accompanying exemplary non-limiting embodiments.

DETAILED DESCRIPTION

With reference to the figures where like elements have been given like numerical designations to facilitate an understanding of the present subject matter, the various embodiments of a system and method for interfacing with financial information are provided.

As more consumers interface with their financial information over the Internet, and switch to mobile devices (e.g. smart phones, tablets) as their primary means of interacting with the Internet, it is increasingly important for financial institutions or entities to have the ability to intelligently interface with user financial information on these mobile devices. Embodiments of the present subject matter can be utilized to provide a user or individual (e.g. a financial institution customer) with the ability to intelligently interface with an entity or custodian (e.g. financial institution) and their user financial information that is also associated with such an entity or custodian. In some embodiments, a custodian can be, for example, a financial institution such as a bank, brokerage firm or other similar entity. Of course, a custodian may also be any agent or any agent's computer or computers acting as an intermediary between two other parties or computers of two other parties where access, such as via the Internet, to certain information or data is designed to be limited, regardless of whether or not the information or data is confidential. A custodian may also include a secure operating system executing on a microprocessor-based computer terminal or device capable of interactive network communications, or wireless device that connects to, and communicates through, the Internet using, for example, a wireless access protocol (WAP) or other protocol, and utilizing operating-system controls to limit access to data.

Figure 1:
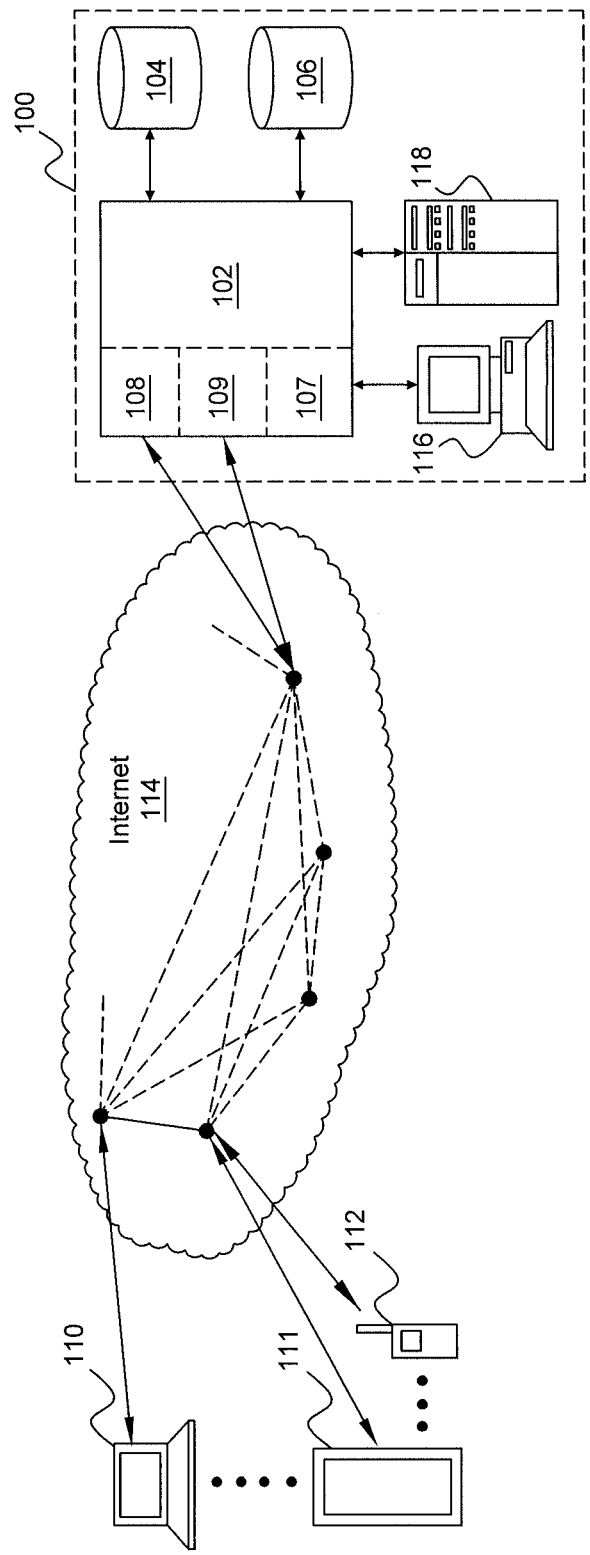
FIG. 1 is an illustration of a wireless banking system connected to a plurality of devices according to some embodiments of the present disclosure.

FIG. 1 is an illustration of a wireless banking system 100 connected to a plurality of devices 110, 111, 112. The wireless banking system 100 may be employed by a custodian described above or any agent or intermediary thereof, for example. An wireless banking system 100 may be selectively coupled to a plurality of devices through the Internet 114 or another known means. Exemplary devices may be desktop or laptop computers 110, tablets 111, mobile devices 112 such as cell phones, smart phones, and the like. Each of the devices 110, 111, 112 may have various devices connected to, or included with, their local computer systems, such as scanners, cameras, webcams, barcode readers, printers, finger print scanners, mouse devices, keyboards, and other interface devices. In some embodiments, each of the devices 110, 111, 112 has a touch screen interface. The wireless banking system 100 may be protected from network attacks by a piece of software or specialized hardware, commonly known as a firewall. It is understood that a firewall may be used to block network connections from the outside world to the banking systems 100 inside the firewall. It is also understood that firewalls are often governed by a set of rules that specify what IP addresses, ports, and even types of traffic are allowed to connect to machines inside the firewall. It is also understood that other network security defense tools may be employed as part of a defense-in-depth strategy to secure the wireless banking system 100 including, but not limited to, intranet subnet partitioning, intrusion detection or host-based intrusion prevention systems. Communications between any or all of the devices to an exemplary wireless banking system 100 may be via a transport layer security (TLS) tunnel or secure sockets layer (SSL) tunnel, virtual private network (VPN) connection, etc. to prevent snooping and/or alteration of such communications and respective information. These tunnels are exemplary only as other cryptographic protocols may be employed to provide communications security over the Internet.

An exemplary wireless banking system 100 may include a processing unit 102 coupled to one or more data storage units 104, 106. The processing unit 102 may provide front-end graphical user interfaces (GUI), e.g., customer GUI 108 and a service provider GUI 109, as well as back-end GUIs 107 to a device 110, 111, 112 or to a local computer 116. The GUIs may take the form of, for example, a webpage that is displayed using a browser program local to the device 110, 111, 112 or to the local computer 116. It is understood that the wireless banking system 100 may be implemented on one or more computers 116, servers 118, or like devices. For example, a wireless banking system 100 may include servers programmed or partitioned based on permitted access to the data of a custodian or customer and may include communications servers to facilitate communications between the devices 110, 111, 112 and the system 100. It should be noted that the terms "consumer," "customer," "individual" and "user" are used interchangeably herein and such use should not limit the scope of the claims appended herewith. Front- and back-end GUIs 107, 108, 109 may be portal pages that include various content retrieved from the one or more data storage devices 104, 106. As used herein, "portal" may be general-purpose Internet portals and/or may include GUIs that are of interest to specific, limited audiences and that provide a user access to a plurality of different kinds of related or unrelated information, links and tools as described below. It should also be noted that the terms "webpage" and "website" may be used interchangeably herein and such use should not limit the scope of the claims appended herewith.

A user or customer may gain access to the wireless banking system 100 by using a device 110, 111, 112, 116, programmed with a Web browser or other software, to locate and select (such as by touching a screen of the device) a particular webpage. Application Programming Interfaces (APIs) may be employed to provide connectivity between applications resident on the devices 110, 111, 112, 116 and underlying data in the system 100 or services provided by an entity, custodian or institution. In exemplary embodiments, a device 110, 111, 112, 116 can support an advanced markup language (e.g. HTML5). In some embodiments, webpage content can be created by client-side scripting. In some embodiments, a webpage is a dynamic webpage. In some embodiments, webpage content can be created by server-side scripting such as, for example, PHP, Perl, JSP, ASP.NET, etc. In some embodiments, dynamic HTML (DHTML) can be used to create webpage content including, for example, a combination of a static markup language (e.g. HTML), a client-side scripting language (e.g. JavaScript), a presentation definition language (e.g. CSS), the Document Object Model, etc.

The content of the webpage may be located on the one or more data storage devices 104, 106. The device 110, 111, 112, 116 may be a microprocessor-based computer terminal, a pager adaptable to communicate through the Internet, Kiosks with Internet access, personal digital assistants (PDAs) (e.g., a PALM device manufactured by Palm, Inc., IPAQ device available from Compaq, iPhone from Apple or BLACKBERRY from RIM), cellular phone, tablet (e.g. iPad manufactured by Apple, or Nook manufactured by Barnes and Noble, Kindle manufactured by Amazon, Nexus manufactured by Google, Galaxy manufactured by Samsung, etc.), slate tablet, booklet computer, convertible notebook, phablet (e.g. LG Optimus Vu, Samsung Galaxy Note, Dell Streak, etc.) or other devices capable of interactive network communications, such as an electronic personal planner. Of course, such devices 110, 111, 112, 116 may be wireless or wire-line that connect to and communicate through the Internet. As mentioned above, an exemplary wireless banking system 100 may provide separate features and functionality for users thereof, including customers and service providers, as well as back-end users that manage the wireless banking system 100.

Figure 2:
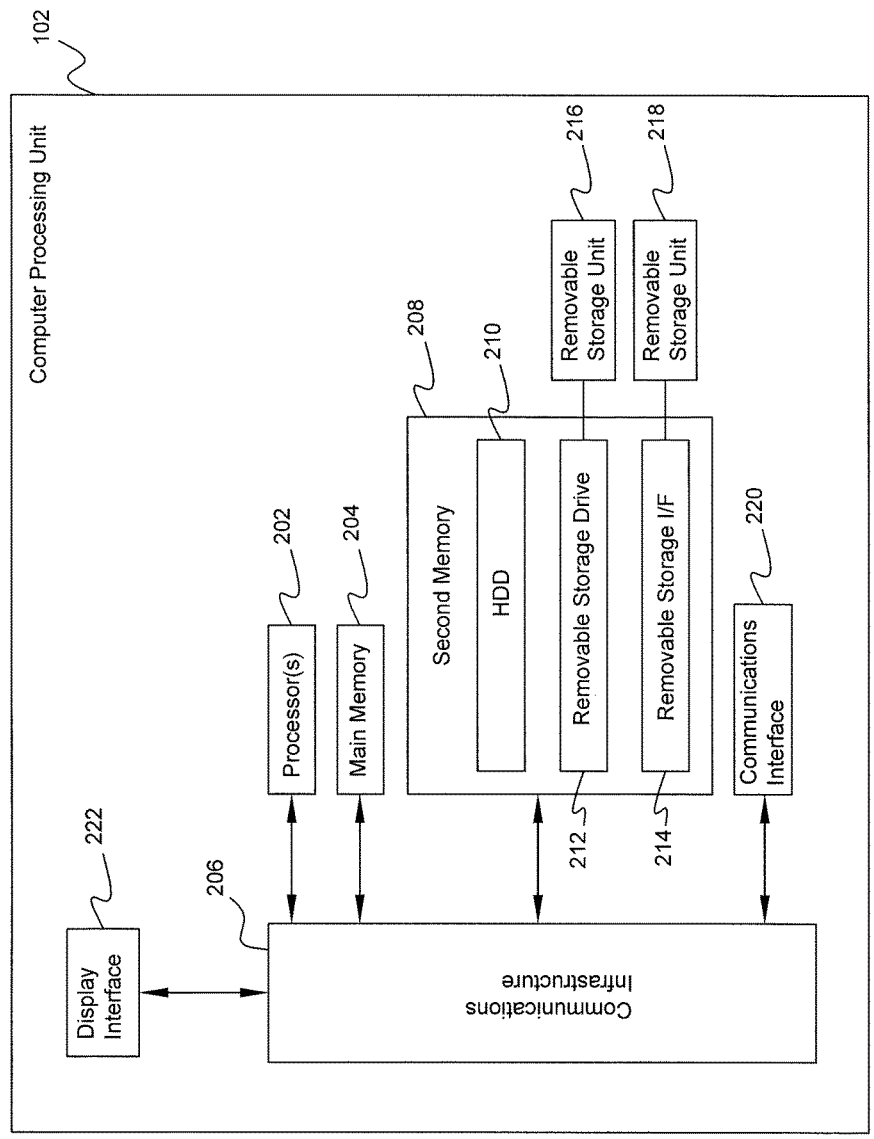
FIG. 2 is an illustration of an architecture of a computer processing unit according to some embodiments of the present disclosure.

FIG. 2 is an illustration of an architecture of a computer processing unit 102 configured to implement the algorithms and software programming associated with the present disclosure. This unit may be a standalone unit or portion thereof. This unit may include a device processor, a server processor, or combination thereof. As illustrated in FIG. 2, the computer processor unit 102 may include one or more processors 202. The processor 202 may be connected to a communication infrastructure 206 (e.g., a communications bus, cross-over bar, server or network). As discussed above, the computer processing unit 102 may include a display interface that forwards graphics, text, and other data from the communication infrastructure (or from a frame buffer not shown) for display on the front- and back-end GUIs 107, 108, 109 and as retrieved from the one or more data storage devices 104, 106.

The computer processing unit 102 may also include a main memory 204, such as a random access memory (RAM), and a secondary memory 208. The secondary memory 208 may include, for example, a hard disk drive (HDD) 210 and/or removable storage drive 212, which may represent a floppy disk drive, a magnetic tape drive, an optical disk drive, or the like. The removable storage drive 212 may read from and/or write to a removable storage unit 216. The removable storage unit 216 may be a floppy disk, magnetic tape, optical disk, or the like. As will be understood, the removable storage unit 216 may include a computer readable storage medium having stored therein computer software and/or data.

In alternative embodiments, the secondary memory 208 may include other similar devices for allowing computer programs or other instructions to be loaded into the computer processing unit 102. The secondary memory 208 may include a removable storage unit 218 and a corresponding interface 214. Examples of such removable storage units include, but are not limited to, USB or flash drives, which allow software and data to be transferred from the removable storage unit 218 to the computer processing unit 102.

The computer processing unit 102 may also include a communications interface 220 allowing software and data to be transferred between computer processing unit 102 and external devices. Examples of a communications interface 220 may include a modem, Ethernet card, wireless network card, a Personal Computer Memory Card International Association (PCMCIA) slot and card, or the like. Software and data transferred via the communications interface 220 may be in the form of signals, which may be electronic, electromagnetic, optical, or the like that are capable of being received by the communications interface 220. These signals may be provided to the communications interface 220 via a communications path (e.g., channel), which may be implemented using wire, cable, fiber optics, a telephone line, a cellular link, a radio frequency (RF) link and other communication channels.

The terms "computer program medium" and "computer readable storage medium" may generally refer to media such as a removable storage drive 212, a hard disk installed in a hard disk drive 210, a non-transitory computer readable storage medium, etc. These computer program products may provide software to computer processing unit 102. Computer programs (also referred to as computer control logic) may also be stored in the main memory 204, secondary memory 208 and/or data storage devices 104, 106. Computer programs may also be received via the communications interface 220. Such computer programs, when executed by a processor, specifically enable the computer processing unit 102 to perform features of the methods discussed herein. In an embodiment implemented using software, the software may be stored in a computer program product and loaded into computer processing unit 102 using a removable storage drive 212, hard drive 210, or communications interface 220. The software, when executed by a processor 202, causes the processor 202 to specifically perform the functions described herein.

As customer interactions with entities such as financial institutions continue to shift toward Internet-based interactions, entities providing efficient, intelligent interfaces that improve a user's experience have significant advantages over other institutions. For example, capable, intelligent interfaces may be employed to improve the experience of a user or individual of a hierarchical (e.g. menu-driven) personal computer interface by minimizing, and efficiently using, user data entry.

One embodiment of the present subject matter may allow an individual to access a banking system utilizing a mobile device 110, 111, 112 such as, but not limited to, a laptop computer, tablet, cell phone, smart phone, and the like. Of course, these devices may include applicable operating systems thereon (e.g., iOS, Android, Windows, etc.). In other embodiments, a banking system can be accessed using a personal computer such as, for example, a desktop computer. As discussed above, exemplary devices can include a touch screen display for intelligently interfacing with a financial information and with a respective institution. A touch screen display can be of any suitable form and technology including, but not limited to, a cathode-ray tube display, a liquid crystal display, a resistive touch screen display, a capacitive touch screen display, a multi-touch capable touch screen display, etc.

By the way of a non-limiting example, an iPhone or iPad (or other device) user may download an application from a third party or an institution for the purpose of interfacing with their financial information, or in the alternative, may visit a website of the institution or third party. The institution or third party can provide the user with an intelligent banking interface to improve a user's experience through the graphical user interface of the device. The inventor has observed that hierarchical (e.g. menu-driven) interfaces provide various challenges to users especially users that frequently travel and have limited time to handle personal matters such as banking or shopping. The inventor has determined that an intelligent interface that minimizes navigational and hierarchical user interactions with an application or website can significantly improve a user's experience in interacting with their financial information and performing a wide variety of interactions and transactions with such financial information. The inventor has determined that providing an intelligent, user-friendly interface is significantly attractive to new and existing customers of a wide variety of Internet-based service providers.

Figure 3A:
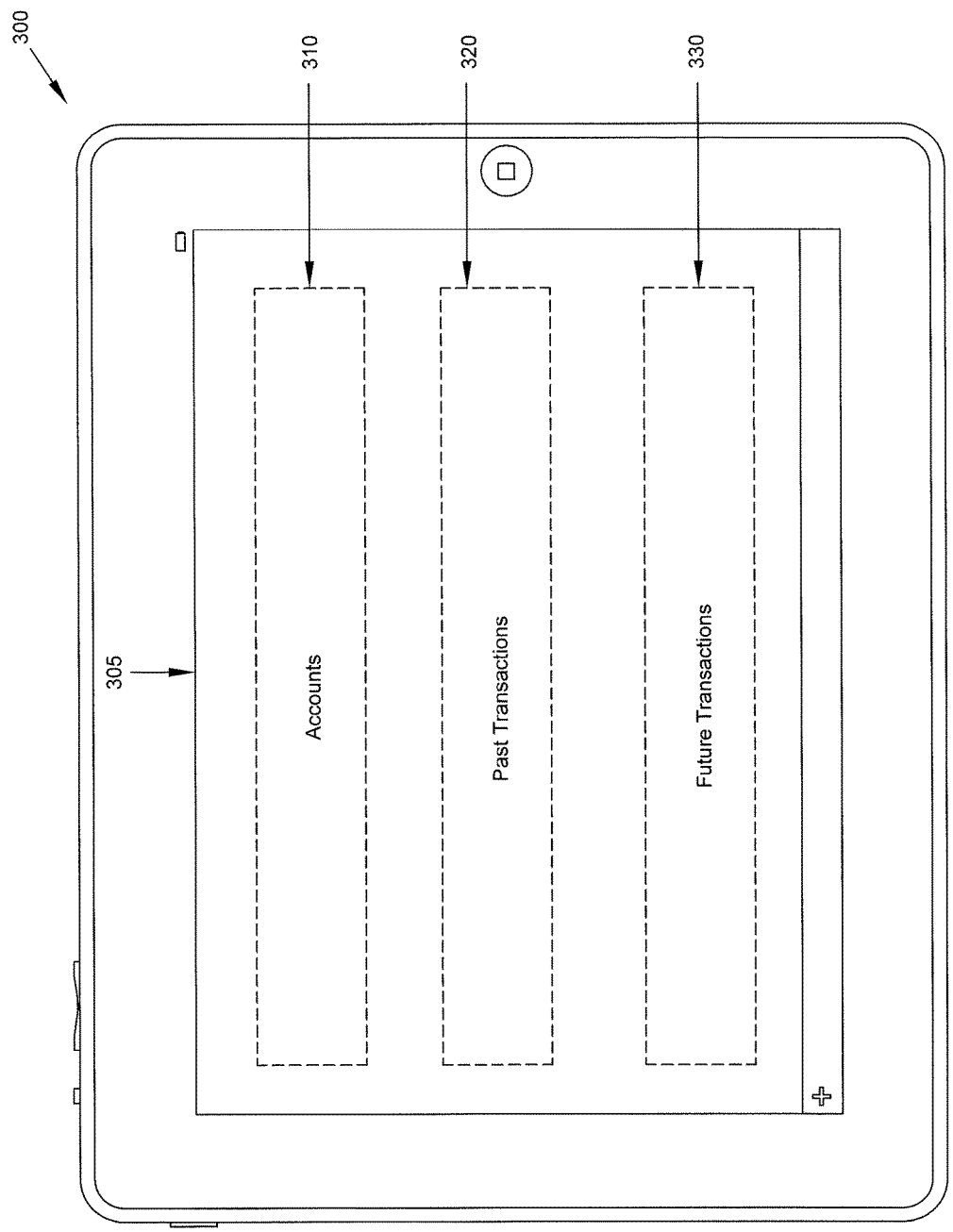
FIGS. 3A-3F are illustrative screenshots according to some embodiments of the present subject matter.

Referring now to FIGS. 3A-3G, illustrative screenshots according to some embodiments of the present subject matter are provided. At FIG. 3A, portions of a system for interfacing with financial information according to some embodiments are illustrated. As shown in FIG. 3A, a touchscreen display 305 is provided. In the illustrated embodiment, a device 300 including the touch screen display 305 is provided. As described above, device 300 can include any suitable device such as, for example, a microprocessor-based computer terminal, a mobile device, a kiosk, a personal digital assistant, a cellular phone, a tablet, an electronic personal planner, a slate tablet, a booklet computer, a convertible notebook, a phablet, a smart phone, etc. Touch-screen display 305 can be any suitable touch screen display. For example, touch screen display can be a cathode ray tube (CRT) touch screen display, a liquid crystal touch screen display (LCD), a LCD resistive touch screen display, a LCD capacitive touch screen display, a LCD multi-touch capable touch screen display, etc.

In some embodiments, touch screen display 305 includes a plurality of logical regions (310, 320, 330). As shown in the embodiments illustrated at FIGS. 3A-3F, each one of the plurality of logical regions (310, 320, 330) can have content that is expandable based on a user selection. For example, as shown in FIG. 3A, logical region 310 includes displayed content of "Accounts", logical region 320 includes displayed content of "Past Transactions", and logical region 330 includes displayed content of "Future Transactions". In some embodiments, a system including touch screen display 305 further includes logic to associate a plurality of a user's financial data of a predetermined type with each one of the logical regions. The logic to associate may be implemented in any suitable form, including, but not limited to, digital electronic circuitry, computer software, firmware, or hardware, and including, for example, as one or more computer program products (e.g. a computer readable storage medium). In the embodiment illustrated in FIGS. 3A-3F, a system includes logic to associate a plurality of a user's account data with logical region 310. For example, a plurality of data associated with one or more user accounts (e.g. a checking account, a general services account, a savings account, a mortgage account, a credit card account, an investment account a retirement account, etc.) can be associated with logical region 310. A system can also include logic to associate a plurality of a user's past transactional data with logical region 320. For example, as shown in FIGS. 3A-3F, a plurality of data associated with a user's past or completed transactions (e.g. bills paid, purchases made, sales, money transferred, investments made, etc.) can be associated with logical region 320. In some embodiments, a system can also include logic to associate a plurality of a user's future transactions (e.g. a bill from a payee, a stock, an exchange-traded fund, a money transfer, a deposit, a mortgage, an order, a scheduled payment, a savings plan, an investment plan, etc.) with logical region 330.

In some embodiments, a system can include logic to vary an amount of the associated financial data displayed on the display 305 based on a type of user selection of one of the logical regions (310, 320, 330). The logic to vary can be implemented in any suitable form. In the embodiment illustrated at FIGS. 3A-3F, a user can interact with the interface to obtain more detailed content associated with one or more of the logical regions (310, 320, 330). A user interaction to select one or more of the logical regions may be any suitable form of user selection (e.g. open pinch, closed pinch, tap, swipe, double click, keyboard stroke, etc.) In some embodiments, one or more logical regions (310, 320, 330) are expandable. The inventor has determined that an intelligent interface in which a user selection mechanism is associated with an intuitive response from the display 305 can significantly improve a user's experience in interacting with their financial information and performing a wide variety of interactions and transactions with such financial information. For example, a user can interact with a logical region using an open pinch type of user selection and the logic to vary can respond by displaying on the display 305 a greater amount of the associated financial data for that logical region (310, 320, 330).

Figure 3B:
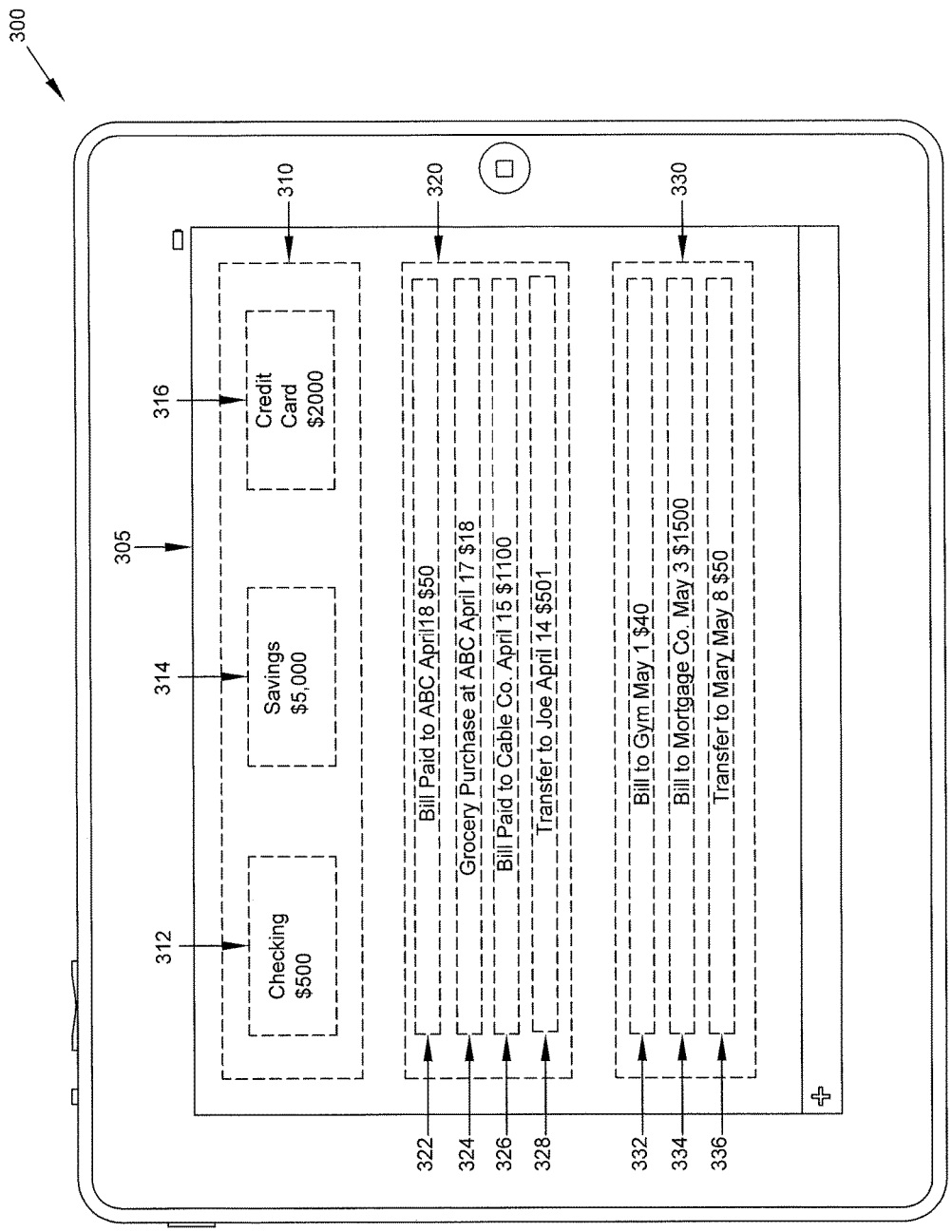

In some embodiments, logic to vary can include logic to display detailed financial data of the predetermined type of the associated logical region based on an open pinch type of user selection of the logical region (310, 320, 330). As shown in FIGS. 3A and 3B, logic to vary can be configured to display information associated with several user accounts based on an open pinch type of user selection of logical region 310. Referring now to FIGS. 3B and 3E, logic to vary can be configured to display a greater amount (e.g. more detailed) account information for a particular account based on an open pinch or tap type of user selection of logical region 310. In the illustrated embodiment, a system can include a plurality of logical subregions (312, 314, 316) in at least one of the plurality of logical regions (310, 320, 330). In some embodiments, each one of the plurality of logical subregions (312, 314, 316) can include content that is expandable based on a user selection. In some embodiments, a system can include logic to associate a plurality of the user's financial data of a predetermined type with each one of the logical subregions. For example, and as shown in FIG. 3B, the system can include logic to associate a plurality of data of a user's checking account with logical subregion 312; a plurality of data of a user's savings account with logical subregion 314, and a plurality of data of a user's credit card account with logical subregion 316. In some embodiments, a system can include logic to associate information of a user's account with one of the logical subregions (312, 314, 316) and logic to associate information of another one of the user's accounts with another one of the logical subregions (312, 314, 316). In some embodiments, one account of the user can be an account at one entity (e.g. bank, mortgage company, brokerage, etc.) and the other account of the user can be an account at another entity. In some embodiments, one account of the user can be a checking account at one entity (e.g. bank, mortgage company, brokerage, etc.) and the other account of the user can be a credit card account at the same entity. In some embodiments, one or more logical subregions (312, 322, 332) are expandable.

Referring now to FIGS. 3B-3F, a system can include logic to vary an amount of a user's associated financial data displayed on display 305 based on a type of user selection of one of the logical subregions (312, 314, 316). The logic to vary can be implemented in any suitable form. For example, and as shown in the illustrated embodiments, logic to vary can include logic to display a greater amount (e.g. more detailed) account information for a particular account (e.g. checking account) based on a type of user selection (e.g. open pinch, tap, click, etc.) of the logical subregion (312, 314, 316). By way of example, and as shown in FIGS. 3B-3F, logic to vary can include logic to display a lesser amount (e.g. less detailed, more limited) account information for a particular account (e.g. checking account) based on a type of user selection (e.g. closed pinch, second tap, second click, etc.) of the logical subregion (312, 314, 316).

In some embodiments, logic to vary can include logic to display limited financial data of the predetermined type based on another type of user selection. (e.g. closed pinch, tap, etc.) In the illustrated embodiment, logic to vary can be configured to display only the title "Accounts" based on another type of user selection (e.g. closed pinch or tap) of logical region 310. Referring back to FIGS. 3A-3F, logic to vary can be configured to display on the display 305 a greater amount of (e.g. more detailed) past transactional data (e.g. type of transaction (paid bills, grocery purchases, money transfers), an amount of the transaction, a date of the transaction, etc.) based on a type of user selection (e.g. open pinch, tap, click, etc.) of logical region 320, and/or a subregion (322, 324, 326, 328) of logical region 320, and a lesser amount of (e.g. less detailed, more limited) past transactional data based on another type of user selection (e.g. closed pinch, second tap, second click, double tap, double click, etc.) of logical region 320. Additionally, by way of example, logic to vary can be configured to display on the display 305 a greater amount of (e.g. more detailed) future transactional data (e.g. type of future transaction (e.g. bills to be paid, a stock scheduled for purchase, an exchange-traded fund scheduled for order, a scheduled money transfer, a scheduled deposit, a scheduled mortgage payment, an order, a scheduled credit card payment, a savings plan contribution, an investment plan contribution, etc.), an amount due for the transaction, a date scheduled for the transaction, etc.) based on a type of user selection (e.g. open pinch, tap, click, etc.) of logical region 330, and/or a subregion (332, 334, 336) of logical region 330, and a lesser amount of (e.g. less detailed, more limited) future transactional data based on another type of user selection (e.g. closed pinch, second tap, second click, double tap, double click, etc.) of logical region 330.

Figure 3C:
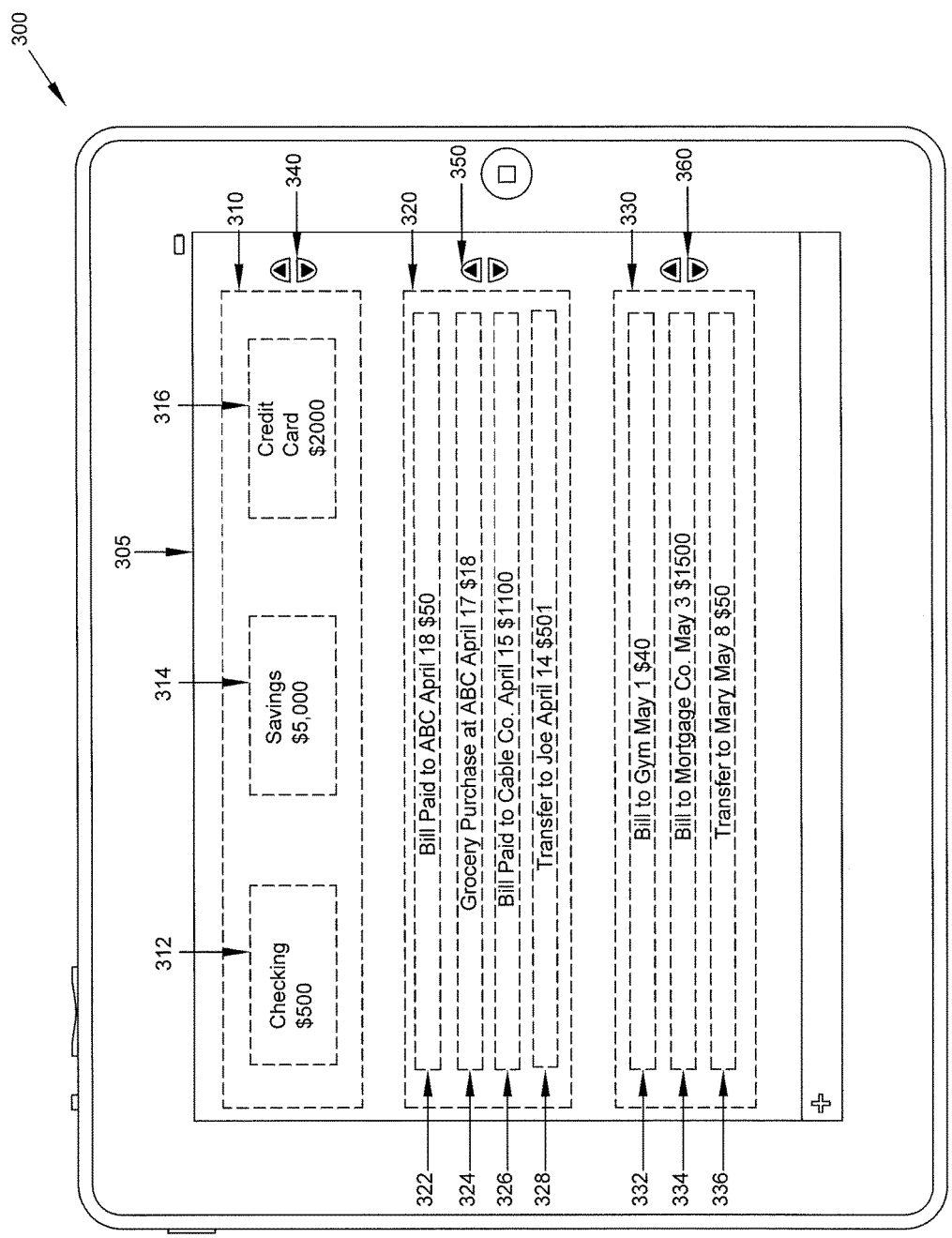
Figure 3D:
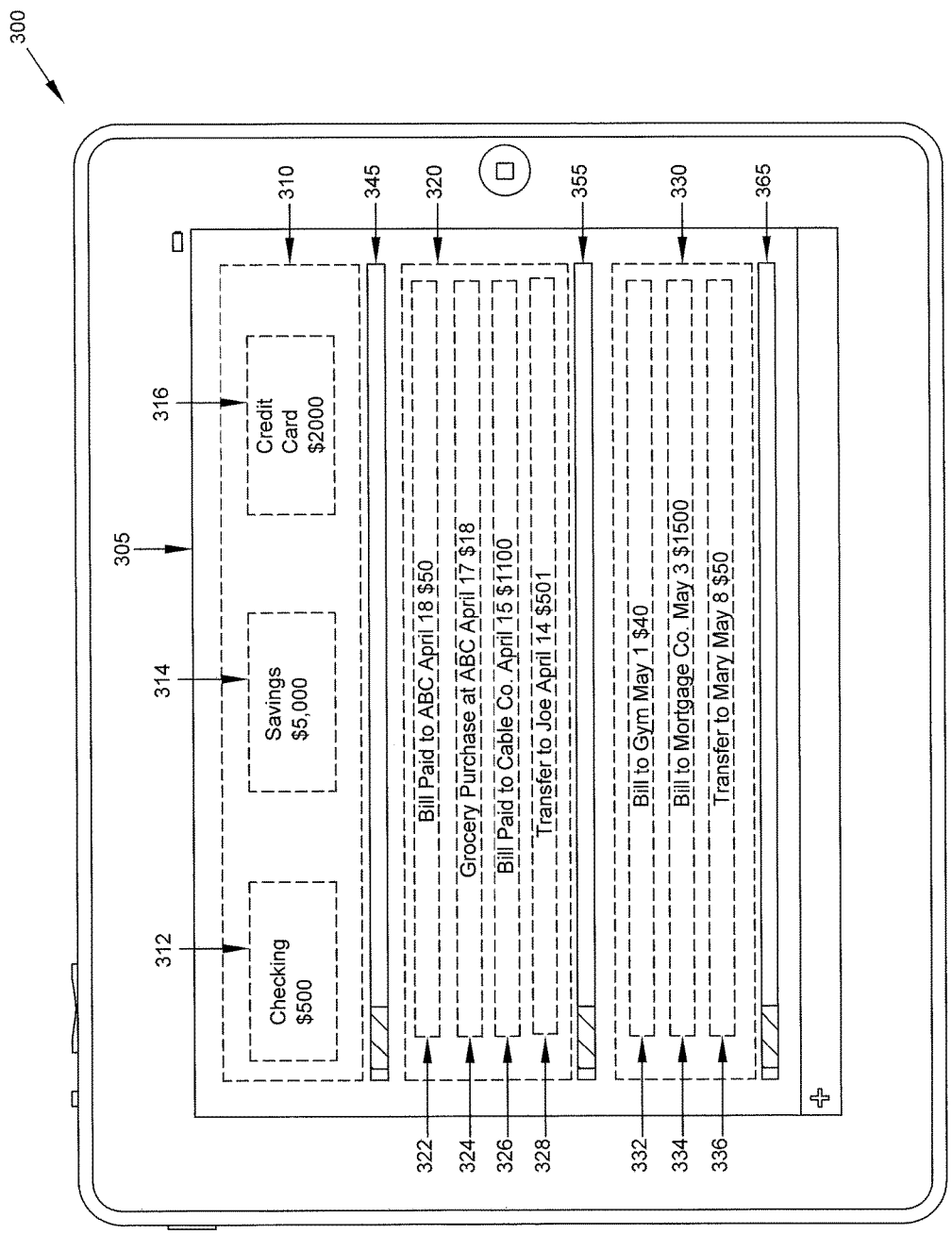
Figure 3E:
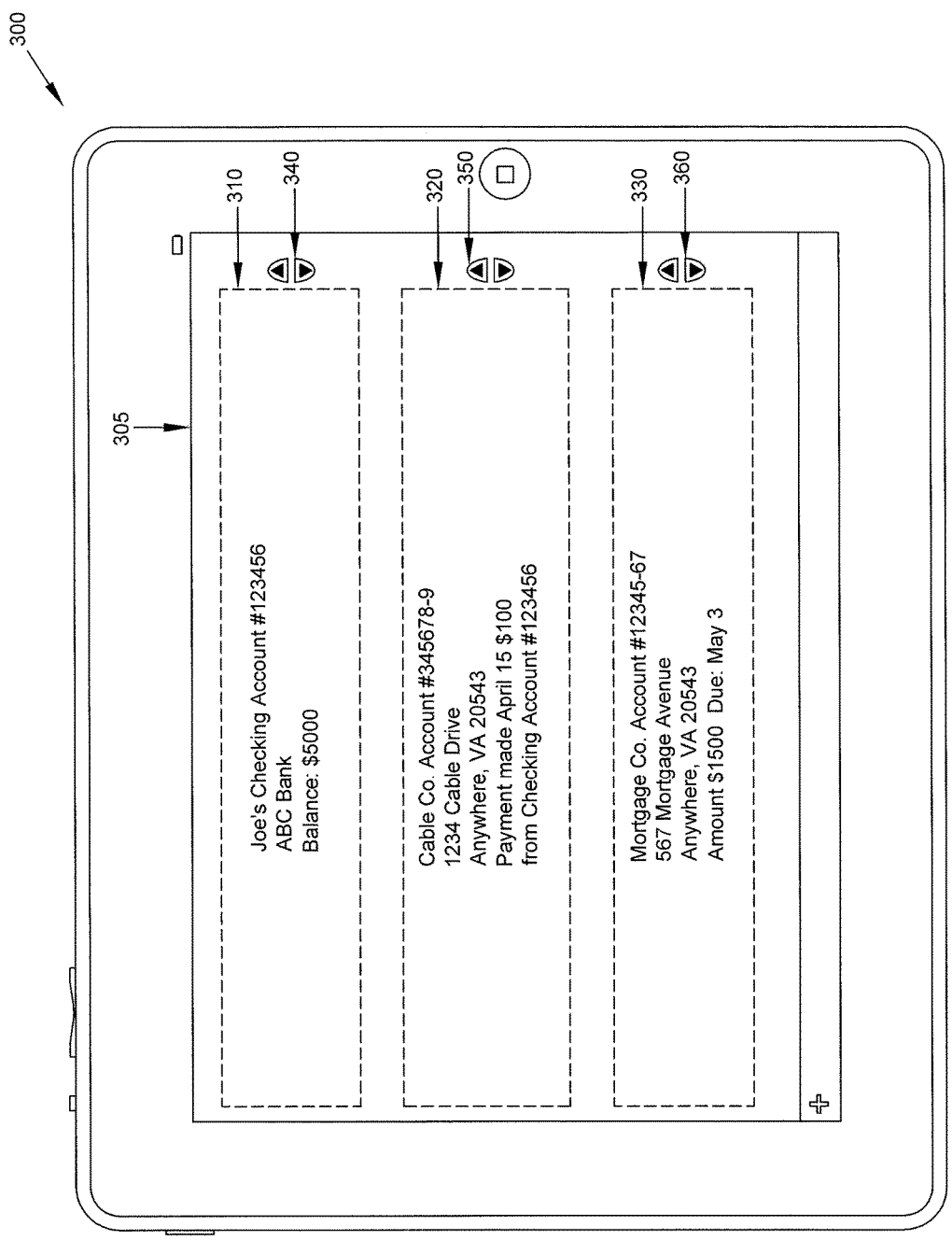
Figure 3F:
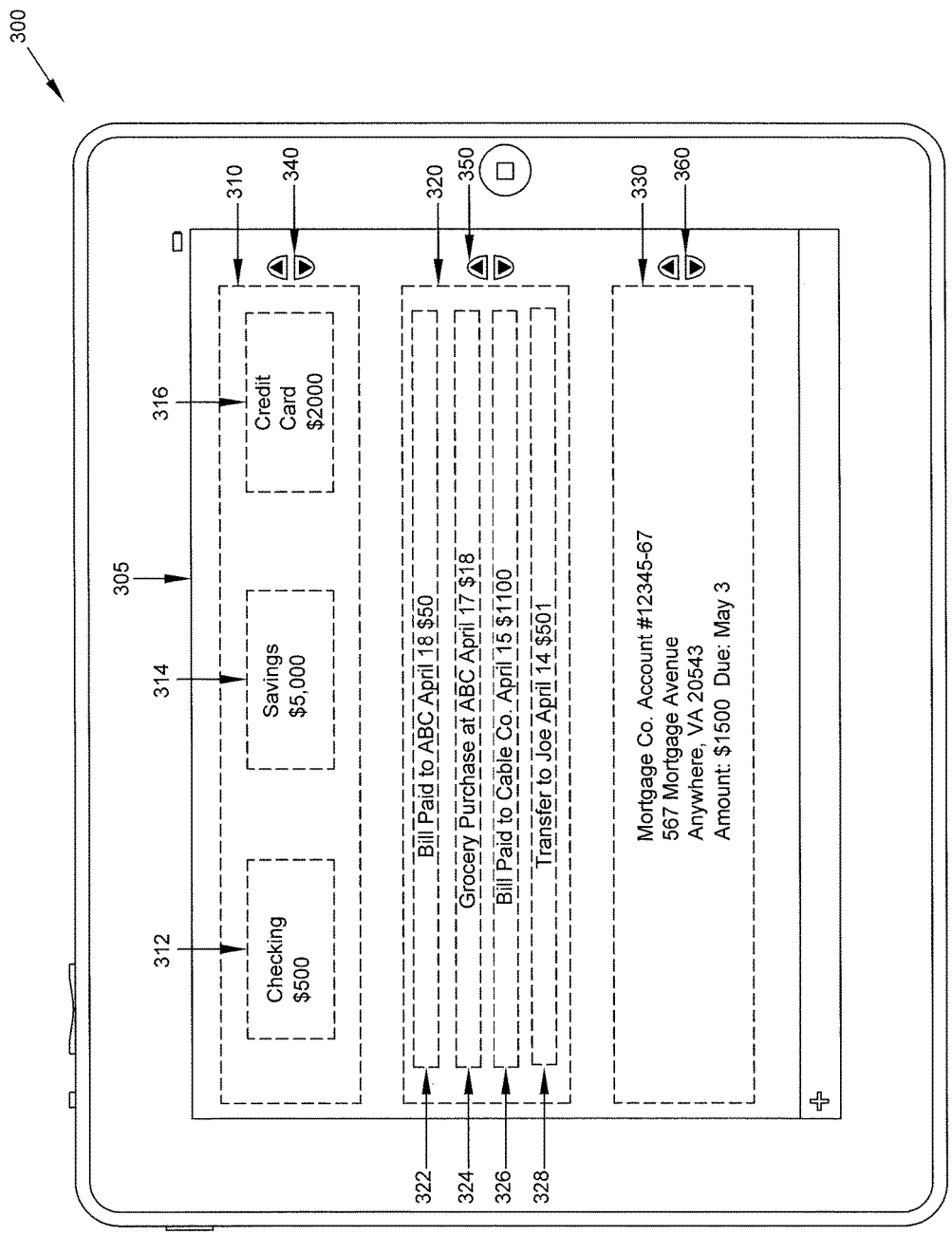

In the illustrated embodiments of 3E and 3F, logic to vary can be configured to display on the display 305 a greater amount of (e.g. more detailed) past transactional data for a particular transaction (e.g. bill payee, customer account number with payee, payee address, an amount of the transaction, a date of the transaction, etc. as shown in FIG. 3E) based on a type of user selection (e.g. open pinch, tap, click, etc.) of logical region 320, or a subregion (322, 324, 326, 328) of logical region 320, and a lesser amount of (e.g. less detailed, more limited) past transactional data (e.g. a listing of past transactions including brief identity of payee, date of transaction, amount of transaction, etc. as shown in FIG. 3F) based on another type of user selection (e.g. closed pinch, second tap, second click, double tap, double click, etc.) of logical region 320, or a subregion of logical region 320. Additionally, by way of example, logic to vary can be configured to display on the display 305 a greater amount of (e.g. more detailed) future transactional data (e.g. bill payee, customer account number with payee, payee address, an amount due for the transaction, a date scheduled for the transaction, etc., as shown in FIG. 3E) based on a type of user selection (e.g. open pinch, tap, click, etc.) of logical region 330, or a subregion (332, 334, 336) of logical region 330, and a lesser amount of (e.g. less detailed, more limited) future transactional data (e.g. a listing of future transactions including brief identity of payee, date of transaction, amount of transaction, etc., as shown in FIG. 3F) based on another type of user selection (e.g. closed pinch, second tap, second click, double tap, double click, etc.) of logical region 330, or a logical subregion (332, 334, 336) of logical region 330.

As shown in the embodiments of FIGS. 3C and 3D, a system can include logic to vary the user's financial data displayed in at least one of the logical regions (310, 320, 330) based on another type user selection. For example, display 305 can include one or more spin boxes (340, 350, 360), or spinners, or scrolls, having an up arrow or a down arrow, to provide the user with an interface to make another type of user selection of a logical region (310, 320, 330). In the illustrated embodiment, a type of user selection can be a selection of an up or down arrow of a spin box (340, 350, 360) associated with a logical region (310, 320, 330). In another embodiment (not shown), a type of user selection can be a selection of a scroll (not shown) associated with a logical region (310, 320, 330). In some embodiments, a system can include logic to vary the user's financial data displayed in at least one of the logical regions (310, 320, 330) based on a user's selection of an up or down arrow of s spin box 340 (or a selection of a scroll) associated with a logical region (310, 320, 330). For example, logic to vary can be configured to display on the display 305 different account data (e.g. mortgage account data, investment account data) based on a user's selection of an up arrow of a spin box 340 associated with logical region 310 and/or less recent past transactional data (e.g. less recent bills paid, less recent transfers made, less recent purchase made, etc.) based on a user's selection of a down arrow of a spin box 350 associated with logical region 320. By way of example, logic to vary can be configured to display on the display 305 closer-in-time, or higher priority, future transactional data (e.g. bills scheduled to paid at a chronologically higher order, scheduled transfers of a higher amount, investments scheduled to be made closer in time to when the user selection is made, etc.) based on a user's selection of an up arrow of a spin box 340 associated with logical region 330.

Referring now to the embodiment shown in FIG. 3D, a display 305 can include one or more swipe bars (345, 355, 365), having a right and left swipe bar to provide the user with an interface to make another type of user selection of a logical region (310, 320, 330). For example, a type of user selection can be a selection of a left or right swipe bar (345, 355, 365) associated with a logical region (310, 320, 330). In some embodiments, a system can include logic to vary the user's financial data displayed in at least one of the logical regions (310, 320, 330) based on a user's selection of a left or right swipe bar (345, 355, 365) associated with a logical region (310, 320, 330). For example, logic to vary can be configured to display on the display 305 different account data (e.g. mortgage account data, investment account data, etc.) based on a user's right swipe of swipe bar 345 associated with logical region 310 and/or different past transactional data (e.g. account debited from, time of transaction, balance remaining after transaction, etc.) based on a user's right swipe of swipe bar 355 associated with logical region 320. By way of example, logic to vary can be configured to display on the display 305 closer-in-time, or higher priority, future transactional data (e.g. bills scheduled to paid at a chronologically higher order, scheduled transfers of a higher amount, investments scheduled to be made closer in time to when the user selection is made, etc.) based on a user's selection of an up arrow of a spin box 340 associated with logical region 330.

In some embodiments, a display 305 can include one or more inline images, tags or logical regions, that are associated with user data of a predetermined type (e.g. financial data of the user at a separate entity than an entity hosting or providing content to the website or app selected by the user, user data associated with a user account at a media downloading site (e.g. iTunes account, Netflix account), user data associated with a user account at a social media site (e.g. Facebook account, Twitter account, LinkedIn account, Myspace account, user data associated with a user account at an online shopping or retailer site (e.g. Amazon.com, Best Buy, Barnes and Noble, eBay) etc.) In some embodiments, a user may initiate a request to link to such data by a predetermined type of user selection (e.g. click, tap, open pinch) of the inline image, tag, or logical region on touch screen display 305.

Figure 4:
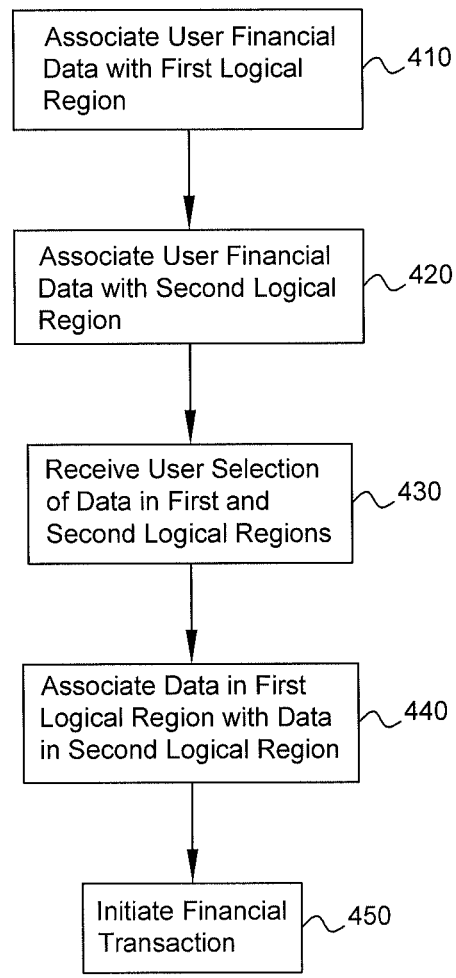
FIG. 4 is a simplified block diagram of one embodiment of the present subject matter.

Referring now to FIG. 4, a simplified diagram showing a method of executing a transaction request according to some embodiments is provided. At block 410, a plurality of a user's financial data of a predetermined type is associated with a logical region (e.g. 310) on a touch screen display 305. At block 420, a plurality of a user's financial data of another predetermined type is associated with a second logical region (e.g. 320, 330) on the touch screen display 305. At block 430, a user selection of at least a portion of the user's financial data in each of the first and second logical regions is received. Any suitable user selection method for selecting data in a first and second logical region, and associated logic for receiving a user selection of the data can be included in a system and method of executing a transaction request. In some embodiments, a user selection of at least a portion of the user's financial data in each of the first and second logical regions (320, 330) may be a drag and drop type of user selection. For example, in some embodiments, a system can include a device 300 that can support an advanced markup language (e.g. HTML5, HTML4 with jQuery) including a Drag and Drop API (e.g. native Drag and Drop API). In some embodiments, objects associated with at least a portion of a user's financial data in two or more logical regions (e.g. 310, 320, 330) and/or logical subregions (e.g. 312, 314, 316) are programmed to have draggable attributes to implement a Drag and Drop operation with such objects. For example, a system can include logic to receive a selection (e.g. a drag tap and hold, a drag click, a drag mouse click, etc.) of a portion of a user's financial data in one logical region (e.g. a bill to be paid at 330, FIG. 3E) and execute a Drag and Drop event such that such user data portion is dragged over display (305) and dropped over a portion of a user's financial data in another logical region (e.g. accounts at 310, FIG. 3B) and/or logical subregion (e.g. checking account at 312, FIG. 3E) to associate (e.g. pair) the respective portions of the user's financial data in the selected logical regions and/or logical subregions.

In some embodiments, a user selection of at least a portion of the user's financial data in each of the first and second logical regions (320, 330) may be a Long Touch, or a Long Press, or a Long Click, type of user selection. For example, in some embodiments, a system can include a device 300 that can support a markup language (e.g. HTML5, HTML4 with jQuery) including a Long Touch API. In some embodiments, objects associated with at least a portion of a user's financial data in two or more logical regions (e.g. 310, 320, 330) and/or logical subregions (e.g. 312, 314, 316) are programmed to have long touch attributes to implement a Long Touch operation (e.g. LongClick ( )) with such objects. For example, a system can include logic to receive a selection (e.g. a long touch, a long click, a long press, a focus of a cursor over a portion with navigation-keys or a trackball and a long press of an "enter" key or trackball, etc.) of a portion of a user's financial data in one logical region (e.g. a bill to be paid at 330, FIG. 3E), receive another selection (e.g. a tap, a touch, a click, a press) of a portion of a user's financial data in another logical region (e.g. accounts at 310, FIG. 3B) and/or logical subregion (e.g. checking account at 312, FIG. 3E), and execute a Long Touch event to associate (e.g. pair) the respective portions of the user's financial data in the selected logical regions and/or logical subregions. In some embodiments, a system can include logic to highlight the selected portion of a user's financial data in a logical region and/or subregion to indicate when the Long Touch operation has been implemented for that logical region and/or subregion. In other embodiments, a system can include logic to provide a movable image, for example a grayed movable image) of the selected portion of a user's financial data in a logical region and/or subregion when the Long Touch operation has been implemented for that logical region and/or subregion.

In some embodiments, a user selection of at least a portion of the user's financial data in each of the first and second logical regions (320, 330) may be a Multitouch type of user selection. For example, in some embodiments, a system can include a device 300 that can support a markup language (e.g. HTML5, HTML4 with jQuery) including a Multitouch API. In some embodiments, objects associated with at least a portion of a user's financial data in two or more logical regions (e.g. 310, 320, 330) and/or logical subregions (e.g. 312, 314, 316) are programmed to have multitouch attributes to implement a Multitouch operation with such objects. For example, a system can include logic to receive a selection (e.g. a touch, a tap, a click, a press, a touch and hold, a tap and hold, a click and hold, a press and hold, etc.) of a portion of a user's financial data in one logical region (e.g. a bill to be paid at 330, FIG. 3E), receive another selection (e.g. a tap, a touch, a click, a press, etc.) of a portion of a user's financial data in another logical region (e.g. accounts at 310, FIG. 3B) and/or logical subregion (e.g. checking account at 312, FIG. 3E) while also receiving the selection of the portion of the user's financial data in the one logical region, and execute a Multitouch event to associate (e.g. pair) the respective portions of the user's financial data in the selected logical regions and/or logical subregions.

At block 440, the at least a portion of the user's financial data of the first logical region (e.g. 310) is associated with the at least a portion of the user's financial data of the second logical region (e.g. 320, 330) based on the received user selection (e.g. Drag and Drop selection, Long Touch selection, Multitouch selection, etc.). For example, in embodiments including a Drag and Drop API, a system can include logic to associate a user's selected financial data in the first logical region with the user's selected financial data in the second logical region by, for example, including an instruction set to associate the data set in code associated with the dragover (e.g. pairing) event. The inventor has determined that by providing an intelligent interface that minimizes navigational and hierarchical user interactions with a financial transaction application or website can significantly improve a user's experience in initiating transaction requests over the Internet. In some embodiments, an intelligent interface where a user initiates a bill pay request by dragging a bill (e.g. FIG. 3E at 330) and dropping it over a checking account that the user wishes to use for bill payment (e.g. FIG. 3E at 310) can significantly improve a user's web bill pay experience over hierarchical menu-driven bill payment systems.

In some embodiments, an intelligent interface where a user initiates an online payment for items pre-added to a shopping cart by dragging a shopping cart and dropping it over a user's credit card account that the user wishes to use for payment can significantly improve a user's online shopping experience over hierarchical menu-driven online payment systems. By way of example, an intelligent interface where a user initiates an online download order for music pre-added to a music downloading site shopping cart by dragging a shopping cart and dropping it over a user's credit card account that the user wishes to use for payment can significantly improve a user's online music downloading experience over hierarchical menu-driven online payment systems.

In some embodiments, a system includes logic to assign the at least a portion of the user's financial data of the logical region (e.g. 310), or logical subregion (e.g. 312), that is selected at an earlier point in time (e.g. dragged object, object that is long touched, object that is tapped and held, etc.) as an initiating portion and logic to assign the at least a portion of the user's financial data of the logical region (e.g. 320, 330), or logical subregion (e.g. 314, 316), In some embodiments, a system can include logic to assign any portion of the user's financial data of any logical region, or any logical subregion, that is selected at an earlier point in time as a default initiating portion and logic to assign any portion of the user's financial data of any logical region, or any logical subregion, that is selected at a later point in time as a default receiving portion. For example, at least a portion of the user's account information in a first subregion (e.g. checking account information) can be assigned as a default initiating portion when selected by a user at an earlier point in time and at least a portion of the user's account information in a second subregion (e.g. savings account information) can be assigned as a default receiving portion when selected by a user at a later point in time.

At block 450, a financial transaction is initiated based on the received user selection and using the associated (e.g. paired) respective portions of the user's financial data of the first and second logical regions (310, 320, 330). For example, in embodiments including a Drag and Drop API, a system can include logic to trigger initiation of a financial transaction by, for example, including an instruction set to provide a summary webpage including one or more transaction parameters associated with the initiated transaction, or a confirmation webpage, at display 305 including one or more transaction parameters to the user in response to the Drag and Drop event. In some embodiments, a method can include the step of displaying information associated with the initiated financial transaction on the display 305 based on the received user selection and wherein the displayed information includes at least a portion of the associated respective portions of the user's financial data of the first (e.g. 310) and second (e.g. 320, 330) logical regions.

In some embodiments, an initiating portion and a receiving portion can have respective associated financial data loaded into predetermined portions of a summary webpage, or a confirmation webpage, on the display 305. For example, in embodiments including a Drag and Drop API, selecting a checking account portion of a logical subregion, dragging the selected checking account portion over a savings account portion of another logical subregion, and dropping the selected checking account portion over the selected savings account portion can have respective checking and savings account information associated (e.g. paired) and automatically loaded into predetermined portions of a summary webpage, or a confirmation webpage, on the display 305 to initiate a funds transfer transaction from the user's checking account to the user's savings account.

Figure 5A:
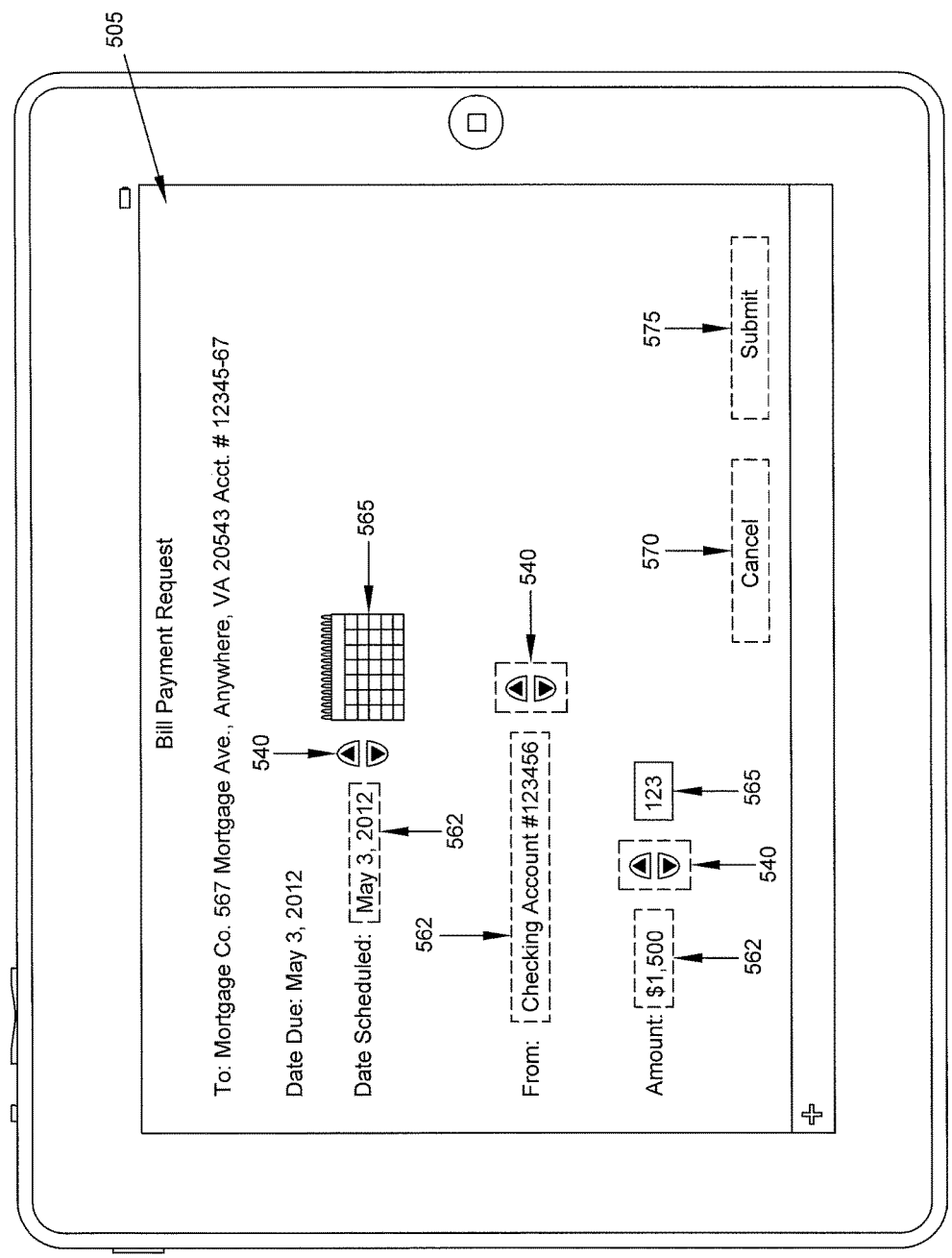
FIGS. 5A-5B are illustrative screenshots according to some embodiments of the present disclosure.

Referring now to FIG. 5A, an example of a screenshot according to some embodiments is provided. In the illustrated embodiment, a summary webpage for an initiated Bill Payment is displayed on display 505 and can include information associated with the initiated bill payment request based on a received user selection (e.g. a Drag and Drop selection of a user's bill (e.g. FIG. 3E at 330) and a checking account that the user wishes to use for bill payment (e.g. FIG. 3E at 310)) and the associated respective portions of the user's financial data of the first (e.g. 310) and second (e.g. 330) logical regions. In the illustrated embodiment, the displayed screenshot can include a name and address of a payee, a date due, a default data scheduled (e.g. the due date on the bill), a default account to be debited (e.g. the selected account of logic region 310), a default amount (e.g. the bill amount), etc.

In some embodiments, at least one selectable parameter for the initiated financial transaction can be displayed at display 505 based on the received user selection and the associated respective portions of the user's financial data of the first and second logical regions. As used herein, a selectable parameter is a transaction parameter that can be selected and having a value that can be modified by the user. In the illustrated embodiment, the date scheduled 562 is a selectable parameter. The date scheduled selectable parameter 562 can be modified by a spin box 540, a text box for tactile entry by a user such as for example, by a touch screen keyboard that is provided in response to a user selection of a text box or a keyboard that is part of a device (e.g. 300) or peripheral to the device (e.g. 300), or a calendar inline image 565 that can provide a touch screen calendar in response to a user selection of the calendar inline image 565. By way of example, in the illustrated embodiment, an account to be debited selectable parameter 562 can be modified by spin box 540, and an amount to be paid selectable parameter that can be modified by a spin box 540, a text box for tactile entry by a user such as for example, by a touch screen keyboard that is provided in response to a user selection of the text box or a keyboard that is part of a device (e.g. 300) or peripheral to the device (e.g. 300), or a numeric pad inline image 565 that can provide a touch screen numeric keypad in response to a user selection of the numeric pad inline image 565. In some embodiments, a selectable parameter can include, but is not limited to, an amount of the transaction, a date of the transaction, an account associated with the transaction, a recurrence for the transaction, a payee identifier, a payee address, a text box for instructions associated with the transaction, a credit card associated with the transaction, a check associated with the transaction, and a confirmation of information associated with the transaction.

In a system including logic to assign any portion of the user's financial data of any logical region, or any logical subregion, that is selected at an earlier point in time as a default initiating portion and logic to assign any portion of the user's financial data of any logical region, or any logical subregion, that is selected at a later point in time as a default receiving portion, a default financial transaction can automatically be initiated. For example, in a system including logic to assign the at least a portion of the user's account information in a first subregion (e.g. checking account information) as a default initiating portion when selected by a user at an earlier point in time and to assign the at least a portion of the user's account information in a second subregion (e.g. savings account information) as a default receiving portion when selected by a user at a later point in time, a default funds transfer from the account associated with the first subregion into the account associated with the second subregion can be initiated. By way of example, in a system including logic to assign the at least a portion of the user's future transaction information in a first region (e.g. bill information) as a default initiating portion when selected by a user at an earlier point in time and to assign the at least a portion of the user's account information in a second region (e.g. checking account information) as a default receiving portion when selected by a user at a later point in time, a default bill payment of the bill associated with the first region from the account associated with the second region can be initiated.

In some embodiments, a system can include logic to evaluate or determine compatibility or suitability of selected portions of a user's financial information in respective regions and/or subregions. In some embodiments, a system can include logic to evaluate or determine compatibility of an assigned, selected default initiating portion and an assigned, selected default receiving portion prior to initiation of a financial transaction. For example, a system can include logic to evaluate or determine whether the selected at least a portion of the user's account information in a first subregion (e.g. savings account information) is compatible with the selected at least a portion of the user's account information in a second subregion (e.g. certificate of deposit account information) prior to initiation of a funds transfer transaction from the user's savings account to the user's certificate of deposit account. By way of example, a system can include logic to evaluate or determine whether the selected at least a portion of the user's past transaction information in a first region (e.g. already paid bill information) is suitable for a transaction with the selected at least a portion of the user's account information in a second region (e.g. checking account information) prior to initiation of a bill payment transaction from the user's checking account.

In some embodiments, a system can include logic to reject initiation of a financial transaction if one or both of the respective selective user financial information portions are determined to be incompatible or not suitable for a transaction. For example, a system can include logic to display a hover indicator (such as a circle with a slash or graying of background) or an error message if a user attempts to select a portion of a region or subregion that is programmed as incompatible with another selected portion of another region or subregion or programmed as not suitable for a financial transaction. In some embodiments, if logic to evaluate compatibility or suitability in a system determines that the selected at least a portion of a user's financial information in a first region or subregion is suitable for a transaction, and compatible with the selected at least a portion of the user's financial information in a second region or subregion, a financial transaction (e.g. a default financial transaction) can be initiated automatically.

Figure 6:
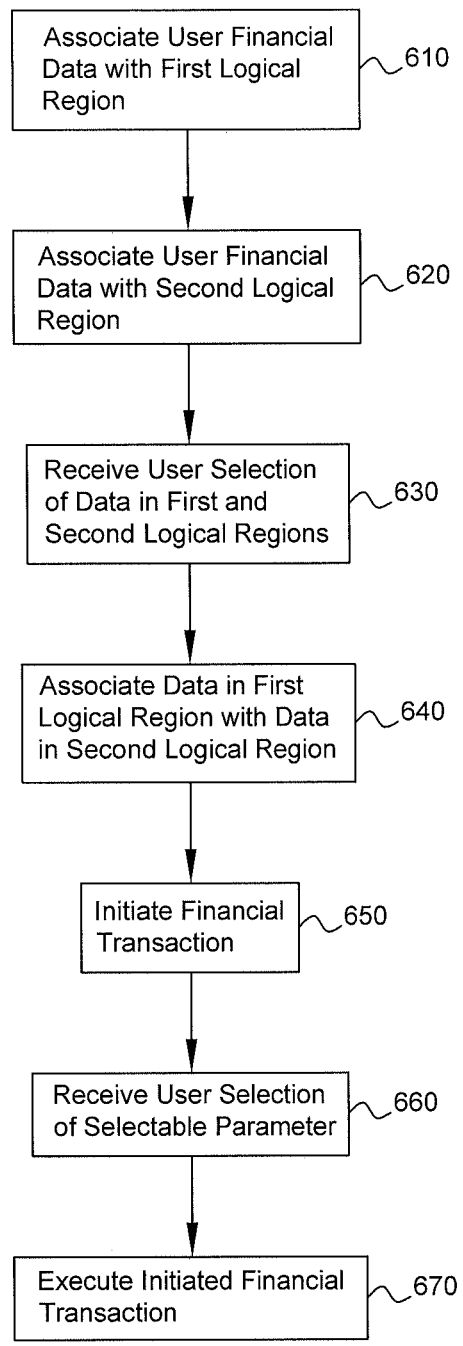
FIG. 6 is a simplified block diagram of one embodiment of the present subject matter.

Referring now to FIG. 6, a financial transaction can be initiated by performing the steps at block blocks 610 to 650 as described above for blocks 410 to 450. At block 660, a user selection of at least one selectable parameter is received. For example, as shown in FIG. 5A, a user selection (e.g. by touch entry input at touch screen display 305) of a date scheduled selectable parameter 562, an account to be debited selectable parameter 562, an amount to be paid selectable parameter 562, a cancellation of a financial transaction request selectable parameter 570, and/or a submission of a financial transaction request selectable parameter 575 can be received at block 660.

Figure 5B:
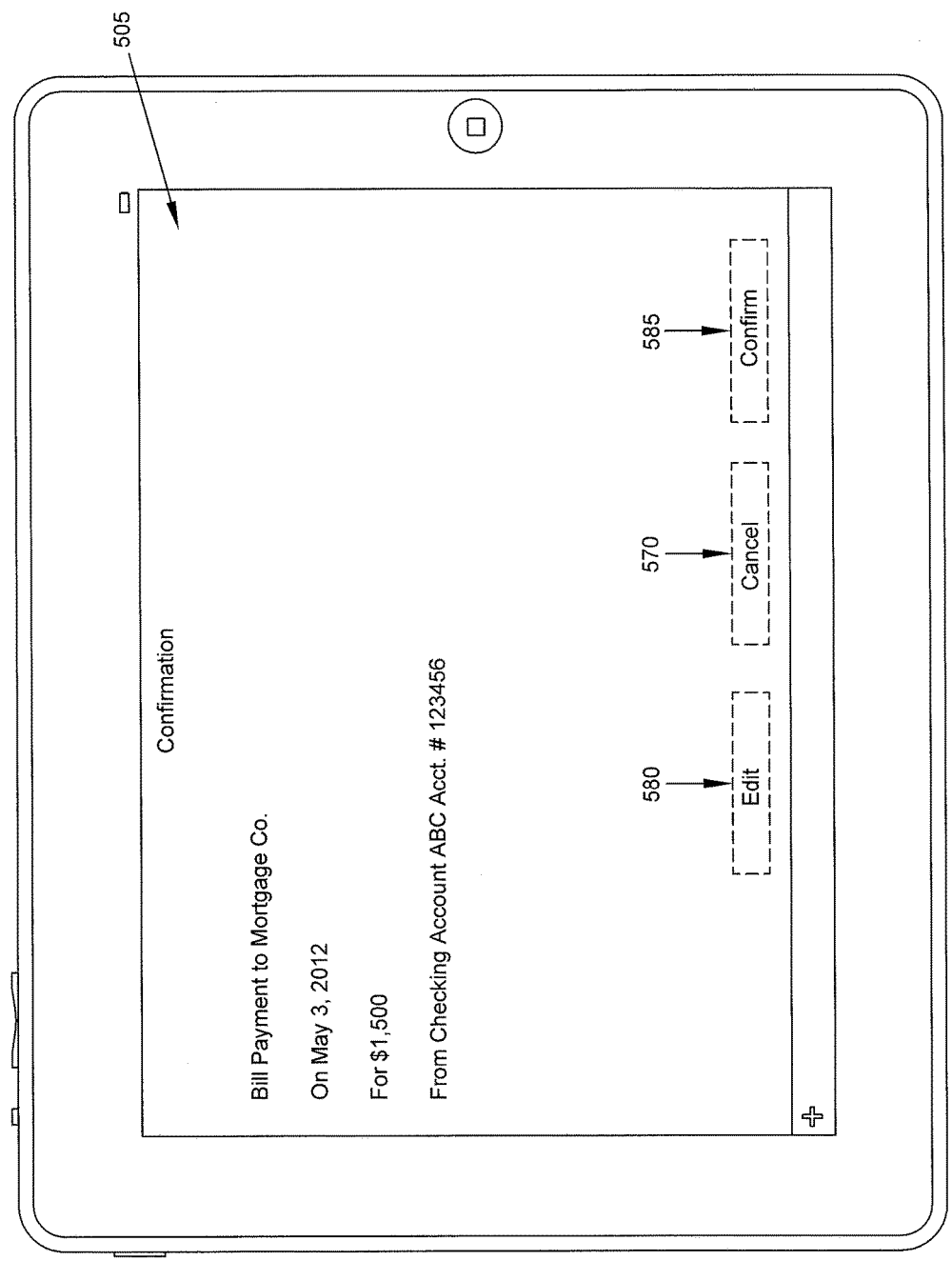

With reference to FIG. 5B, an example of a screenshot according to some embodiments is provided. In the illustrated embodiment, a confirmation webpage for an initiated Bill Payment is displayed on display 505 and can include information associated with the initiated bill payment request based on a received user selection (e.g. a Drag and Drop selection of a user's bill (e.g. FIG. 3E at 330) and a checking account that the user wishes to use for bill payment (e.g. FIG. 3E at 310)) and the associated respective portions of the user's financial data of the first (e.g. 310) and second (e.g. 330) logical regions. In some embodiments, a confirmation webpage can be provided based on a user's selection of one or more selectable parameters 562. In another embodiment, a confirmation webpage can be provided and can include one or more selectable parameters 562. In the illustrated embodiment, the displayed screenshot can include a simplified identification of the transaction, a name of the payee, a date scheduled, an amount and an account to be debited displayed on display 505. In some embodiments, a confirmation webpage can include an edit of a financial transaction request selectable parameter 580, a cancellation of a financial transaction request selectable parameter 570, and/or a confirmation of a financial transaction request selectable parameter 575. In some embodiments, the one or more selectable parameters illustrated in FIG. 5B can be received at block 660. At block 670, the initiated financial transaction can be executed based on the received user selection of the at least one selectable parameter.

The initiated financial transaction can be executed using any suitable method. For example, a financial institution or a third party service provider (e.g. check service provider) can provide a paper check or electronic check based on the customer's initiated financial transaction request (e.g. bill payment request) to the third party payee on behalf of the user. In an embodiment, the third party payee can then deposit the check in a financial institution of the third party, such as for example, a bank of first deposit. One skilled in the art would understand that a bank of first deposit can include any financial institution where a customer's check is initially deposited to an account. For example, if the check is drawn on another financial institution or bank, the collecting bank may present the check directly to a paying financial institution or the collecting bank may present the check to a correspondent bank or clearinghouse corporation, or to the Federal Reserve Bank for settlement against a paying financial institution's reserve account. One skilled in the art would also understand that a Federal Reserve Bank may be any of the regional banks in the Federal Reserve System. In an embodiment, the bank of first deposit may scan the deposited check and send an electronic image of the deposited check, or a substitute check, to a paying financial institution or Federal Reserve Bank as appropriate. In an embodiment including a Federal Reserve Bank, the Federal Reserve Bank may process the check and send an electronic image, or substitute check, to the paying bank through, for example, the Federal Reserve's Automated Clearing House (ACH) system. In an embodiment, a correspondent bank or clearinghouse corporation may process the check through an electronic check processing system such as, for example, FedWire or Clearing House Interbank Payment System (CHIPS).

Figure 7:
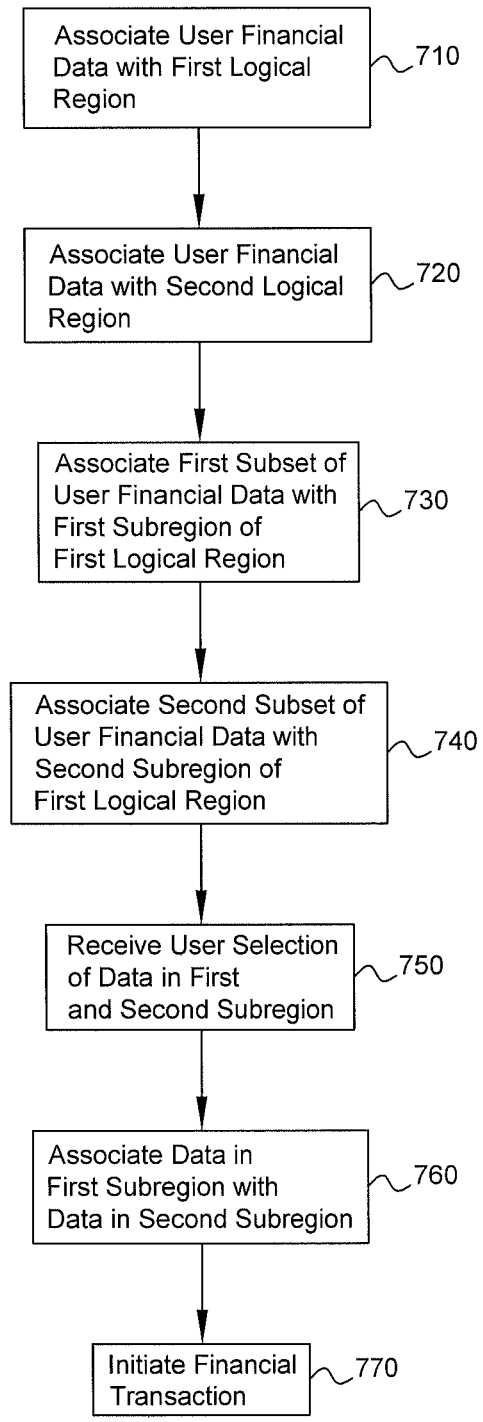
FIG. 7 is a simplified block diagram of another embodiment of the present subject matter.

Referring now to FIG. 7, a method of executing a financial transaction request according to some embodiments is provided. At blocks 710 to 720, a plurality of a user's financial data of a respective predetermined type is associated with respective logical regions (310, 320, 33) on a touch screen display 305 as described above for blocks 410 to 420. At block 730, a first subset of the data of the first predetermined type is associated with one logical subregion (e.g. 312) in one logical region (e.g. 310). For example, in some embodiments, account information of the user (e.g. checking account information, a general services account information, a savings account information, a mortgage account information, a credit card account information, an investment account information, a retirement account information, etc.) is associated with one logical subregion (e.g. 312) in one logical region (e.g. 310). At block 740, a second subset of the data of the first predetermined type is associated with another logical subregion (314, 316) in the logical region (e.g. 310). For example, in some embodiments, other account information of the user is associated with another logical subregion (314, 316) in the one logical region (e.g. 310). Referring back to FIG. 3B, a user's checking account information can be associated with logical subregion 312 of logical region 310 and a user's savings account information can be associated with logical subregion 314 of logical region 310. At block 750, a user selection of at least a portion of the user's account information in each of the first (e.g. 312) and second (e.g. 314) logical subregions can be received. Any suitable user selection method can be used. For example, a user selection of at least a portion of the user's financial data in each of the first and second logical subregions (e.g. 312, 314) can be a drag and drop type of user selection. In other embodiments, a user selection method can be a long touch type of user selection or a multitouch type of user selection.

At block 760, the selected at least a portion of the data of one of the selected logical subregions (e.g. 312) can be associated (e.g. paired) with the selected at least a portion of the data of the other selected logical subregion (e.g. 314) based on the received user selection. For example, in some embodiments, a selected at least a portion of a user's account information of one of the selected logical subregions (e.g. 312) can be associated with the selected at least a portion of the user's account information of the other selected logical subregion (e.g. 314) based on the received user selection. For example, in embodiments including a Drag and Drop API, a system can include logic to associate (e.g. pair) a user's selected financial data in the first logical subregion with the user's selected financial data in the second logical subregion by, for example, including an instruction set to associate the data set in code associated with the dragover event. As described above, the inventor has determined that providing an intelligent interface that minimizes navigational and hierarchical user interactions with a financial transaction application or website can significantly improve a user's experience in initiating transaction requests over the Internet. In some embodiments, an intelligent interface where a user initiates a funds transfer request by dragging a checking account (e.g. FIG. 3B at 312) and dropping it over a savings account that the user wishes to transfer funds into (e.g. FIG. 3B at 314) can significantly improve a user's web funds transfer experience over hierarchical menu-driven funds transfer systems. In some embodiments, an intelligent interface where a user initiates an online funds transfer request by dragging a checking account (e.g. FIG. 3B at 312) and dropping it over a credit card account that the user wishes to transfer funds into (e.g. FIG. 3B at 316) can significantly improve a user's web credit card payment experience over hierarchical menu-driven credit card payment systems.

At block 770, a financial transaction can be initiated based on the received user selection and using the associated respective selected portions of the data of the first (e.g. 312) and second (e.g. 314, 316) logical subregions. For example, in some embodiments, a funds transfer financial transaction between a user's accounts can be initiated based on the received user selection and using the associated respective selected portions of the user's account information of the first (e.g. 312) and second (e.g. 314, 316) logical subregions.

For example, in embodiments including a Drag and Drop API, a system can include logic to trigger initiation of a financial transaction by, for example, including an instruction set to provide a summary webpage including one or more transaction parameters associated with the initiated transaction, or a confirmation webpage, at display 305 including one or more transaction parameters to the user in response to the Drag and Drop event. In some embodiments, a method can include the step of displaying information associated with the initiated financial transaction on the display 305 based on the received user selection and wherein the displayed information includes at least a portion of the associated respective portions of the user's financial data of the first (e.g. 312) and second (e.g. 314, 316) logical subregions. In some embodiments, in a system including logic to assign the first subset of user financial data of a first predetermined type (e.g. checking account information) as a default initiating portion when selected by a user at an earlier point in time and to assign the second subset of user financial data of the first predetermined type (e.g. savings account information) as a default receiving portion when selected by the user at a later point in time, the system can automatically initiate a default funds transfer from the account associated with the first subregion into the account associated with the second subregion. In some embodiments, a system can determine the compatibility of the selected initiating portion and receiving portions of user financial data, and/or determine whether the selected initiating portion is suitable for a default transaction with the selected receiving portion, prior to initiation of the default financial transaction. In some embodiments, a system can reject initiation of a default financial transaction if one or both of the selected initiating and receiving portions of user financial data are determined to be incompatible or not suitable for the default financial transaction.

Figure 8A:
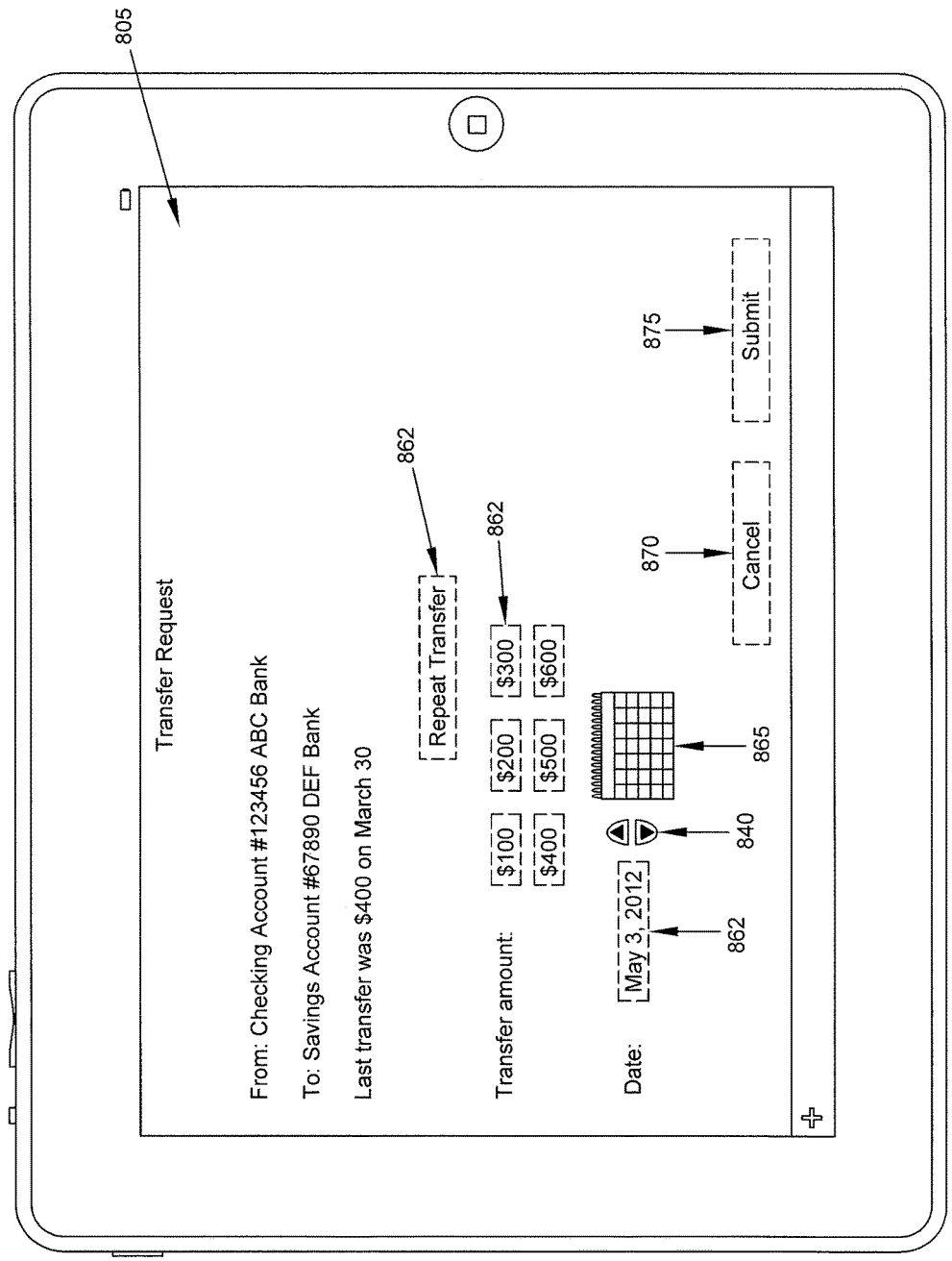
FIGS. 8A-8B are illustrative screenshots according to some embodiments of the present disclosure.

Referring now to FIG. 8A, an example of a screenshot according to some embodiments is provided. In the illustrated embodiment, a summary webpage for an initiated funds transfer transaction is displayed on display 805 and can include information associated with the initiated funds transfer request based on a received user selection (e.g. a Drag and Drop selection of a user's checking account (e.g. FIG. 3B at 312) and a user's savings account that the user wishes to transfer funds into (e.g. FIG. 3B at 314)) and the associated respective portions of the user's financial data of the first (e.g. 312) and second (e.g. 314) logical subregions. In the illustrated embodiment, the displayed screenshot can include a checking account number, a bank holding the checking account, a savings account number, a bank holding the savings account, last funds transfer information between the two accounts, a default transfer amount, default data scheduled (e.g. a date that the funds transfer request was initiated), etc.

Figure 9:
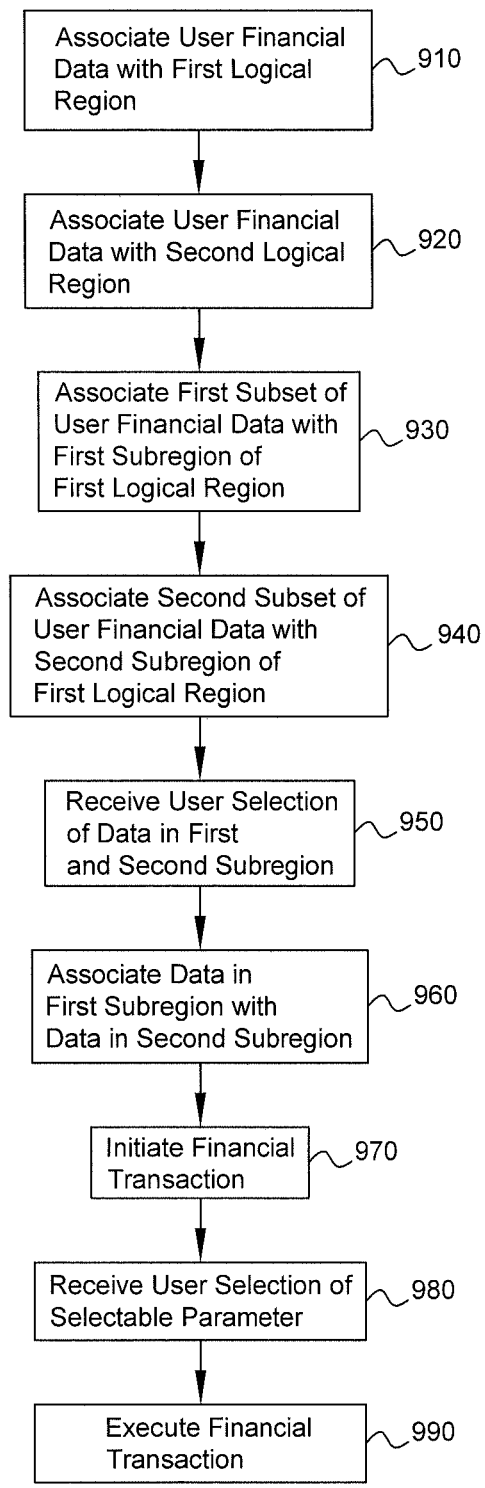
FIG. 9 is a simplified block diagram of an embodiment of the present disclosure.

In some embodiments, at least one selectable parameter for the initiated financial transaction can be displayed at display 805 based on the received user selection and the associated respective portions of the user's financial data of the first (e.g. 312) and second (e.g. 314, 316) logical subregions. In the illustrated embodiment, the transfer date scheduled 862 is a selectable parameter. The transfer date scheduled selectable parameter 862 can be modified by a spin box 840, a text box, a calendar inline image 865, etc. By way of example, in the illustrated embodiment, a repeat transfer selectable parameter 862 can be provided to permit a user to repeat a prior funds transfer between the selected accounts. A transfer amount selectable parameter 862 can be selected by, for example, a selection of one of the inline image transfer amounts. Referring now to FIG. 9, a financial transaction can be initiated by performing the steps at blocks 910 to 970 as described above for blocks 710 to 770. At block 980, a user selection of at least one selectable parameter is received. For example, as shown in FIG. 8A, a user selection (e.g. by touch entry input at touch screen display 805) of a date scheduled selectable parameter 862, a repeat transfer selectable parameter 862, a transfer amount selectable parameter 862, a cancellation of a financial transaction request selectable parameter 870, and/or a submission of a financial transaction request selectable parameter 875 can be received at block 880.

Figure 8B:
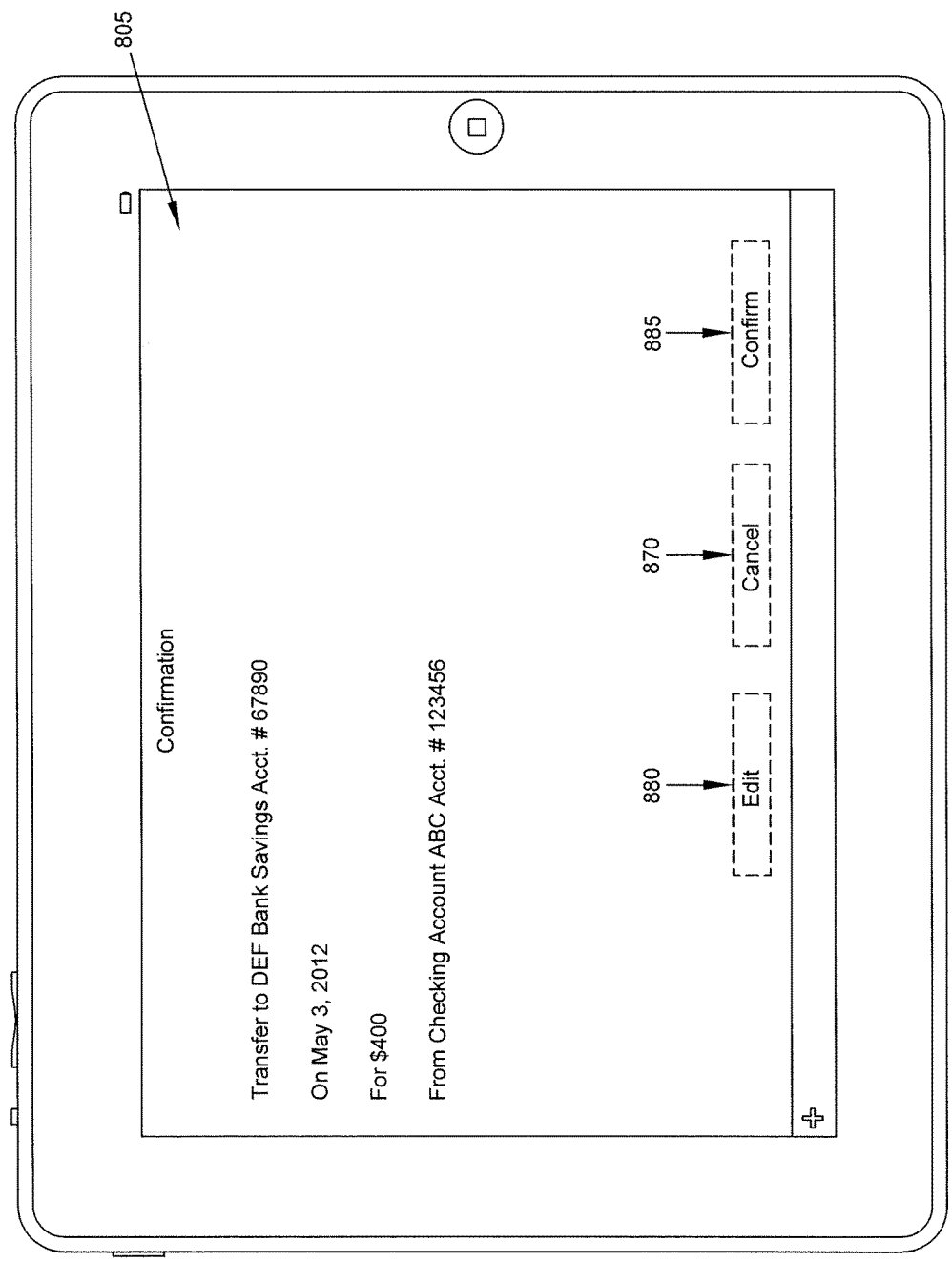

With reference to FIG. 8B, an example of a screenshot according to some embodiments is provided. In the illustrated embodiment, a confirmation webpage for an initiated funds transfer is displayed on display 805 and can include information associated with the initiated funds transfer request based on a received user selection (e.g. a Drag and Drop selection of a user's checking account (e.g. FIG. 3B at 312) and a savings account that the user wishes to transfer funds into (e.g. FIG. 3B at 314)) and the associated respective portions of the user's financial data of the first (e.g. 312) and second (e.g. 314) logical subregions. In some embodiments, a confirmation webpage can be provided based on a user's selection of one or more selectable parameters 862. In another embodiment, a confirmation webpage can be provided and can include one or more selectable parameters 862. In the illustrated embodiment, the displayed screenshot can include a simplified identification of the transaction, an identification of the recipient account, an identification of the financial institution of the recipient account, a transfer amount and an identification of the transferor account. In some embodiments, a confirmation webpage can include an edit of a financial transaction request selectable parameter 880, a cancellation of a financial transaction request selectable parameter 870, and/or a confirmation of a financial transaction request selectable parameter 875. In some embodiments, the one or more selectable parameters illustrated in FIG. 8B can be received at block 880. At block 890, the initiated financial transaction can be executed based on the received user selection of the at least one selectable parameter. The initiated financial transaction can be executed using any suitable method.

Figure 10:
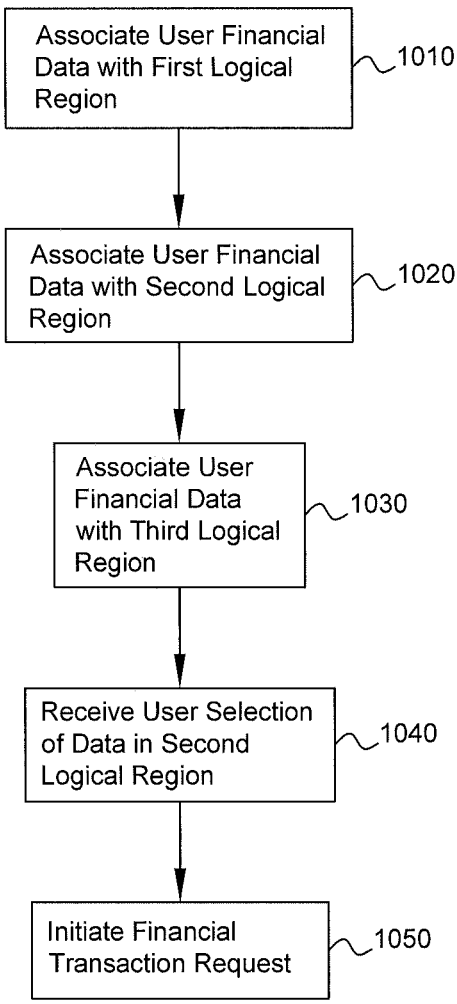
FIG. 10 is a simplified block diagram of an embodiment of the present disclosure.

Referring now to FIG. 10, a simplified block diagram is provided according to an embodiment of the present disclosure. At blocks 1010 to 1020, a plurality of a user's financial data of a respective predetermined type is associated with respective logical regions (310, 320, 330) on a touch screen display 305 as described above for blocks 410 to 420. At block 1030, a plurality of a user's financial data of a predetermined type is associated with another logical region (e.g. 310, 320, 330). At block 1040, a user selection of data in one logical region (e.g. 320) is received. For example, a user selection of a past bill paid (e.g. FIG. 3B at 320) in one logical region can be received. Any suitable user selection method can be used. In another embodiment, a user selection of a future bill scheduled to be paid can be received. At block 1050, a financial transaction request can be initiated. For example, a dispute of a past bill paid or other financial transaction can be initiated at block 1050. In another embodiment, a cancellation request of a scheduled bill payment or other financial transaction can be initiated at block 1050.

Figure 11A:
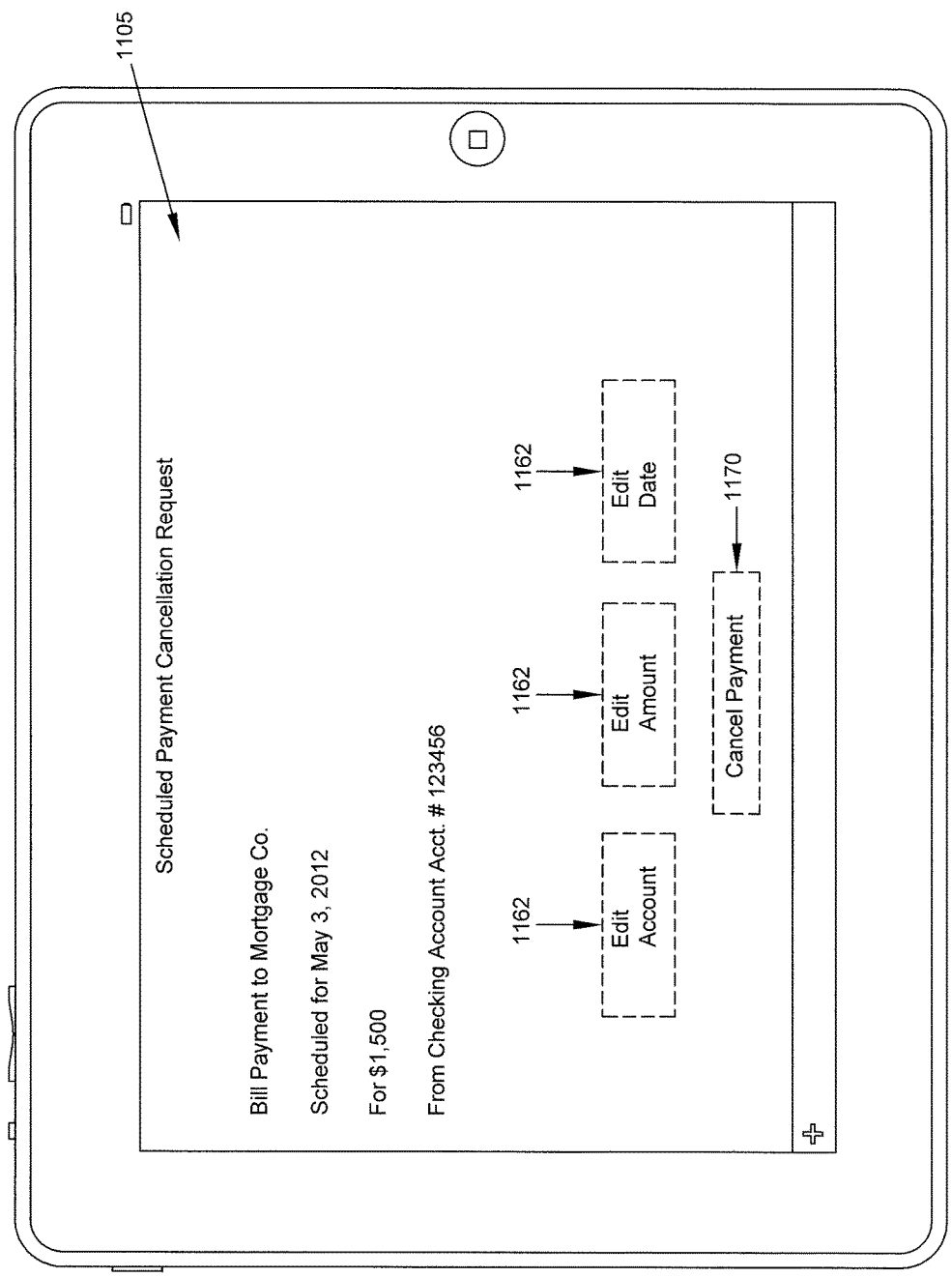
FIGS. 11A-11B are illustrative screenshots according to some embodiments of the present subject matter.

In some embodiments, a method can include the step of displaying information associated with the initiated financial transaction on the display 1105 based on the received user selection and wherein the displayed information includes at least a portion of the associated portion of the user's financial data of the selected logical region (e.g. 320). Referring now to FIG. 11A, an example of a screenshot according to some embodiments is provided. In the illustrated embodiment, a cancellation webpage for a scheduled bill payment transaction is displayed on display 1105 and can include information associated with the initiated bill payment cancellation based on a received user selection (e.g. a tap or click of a bill scheduled for payment (e.g. FIG. 3B at 330) and the associated portion of the user's financial data of the third (e.g. 330) logical region. In the illustrated embodiment, the displayed screenshot can include a description of the bill payment, the payee, the account number to be debited, and the scheduled payment amount. In the illustrated embodiment, a cancellation webpage can include an edit of a date selectable parameter 1162, an edit of an amount selectable parameter 1162, an edit of an account selectable parameter 1162, a cancellation of a financial transaction request selectable parameter 1170, and/or any suitable selectable parameter 1162.

Figure 11B:
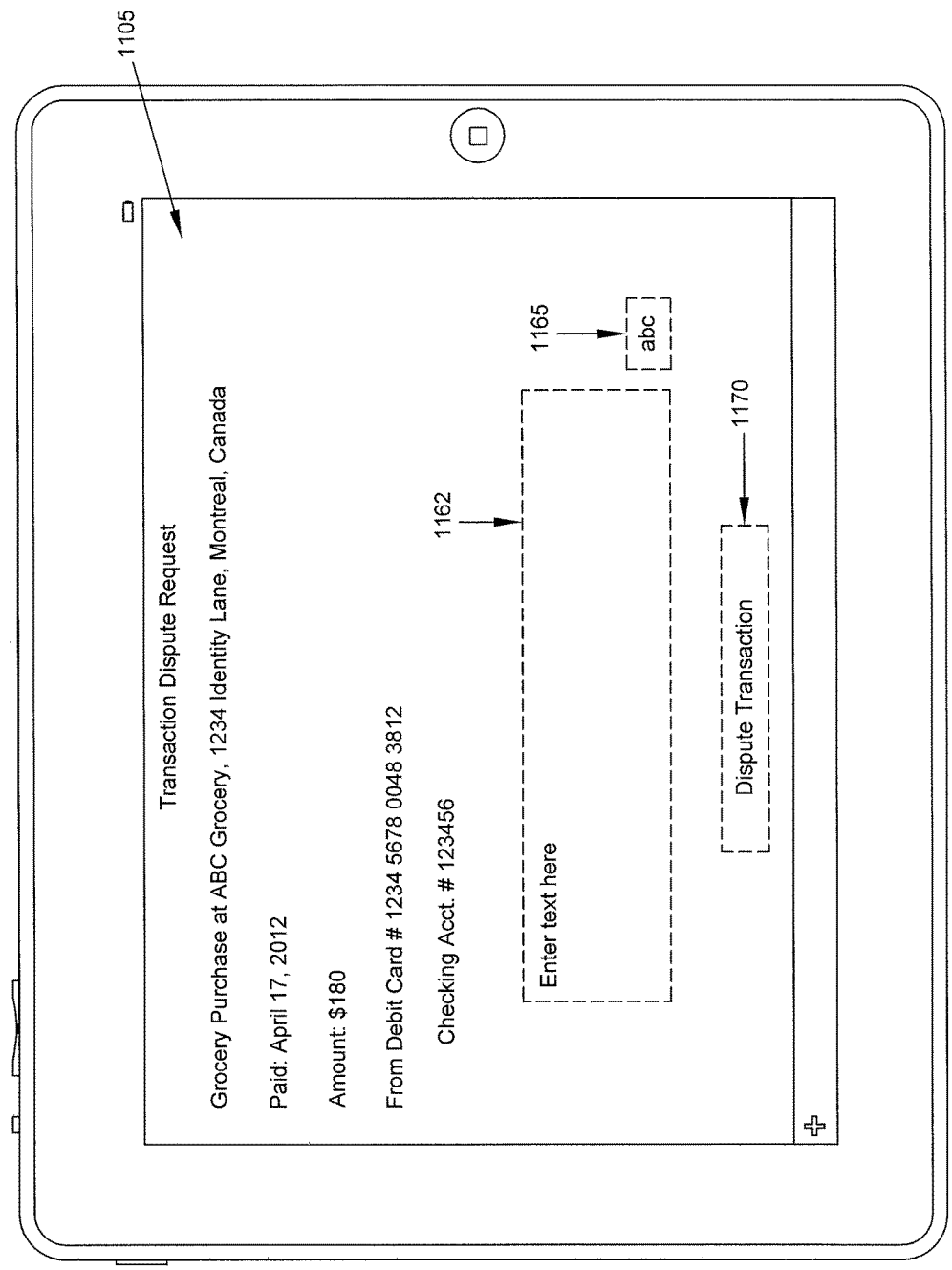

Referring now to the embodiment illustrated in FIG. 11B, a summary webpage for a disputed financial transaction is displayed on display 1105 and can include information associated with the initiated financial transaction dispute based on a received user selection (e.g. a tap or click of a past financial transaction (e.g. FIG. 3B at 320) and the associated portion of the user's financial data of the second (e.g. 320) logical region. In the illustrated embodiment, the displayed screenshot can include a description of past transaction, the payee, the payee address, the account number (or card number) for the account debited, the transaction date and the transaction amount. In the illustrated embodiment, a dispute webpage can include a text box selectable parameter 1162, a submission of a financial transaction dispute request selectable parameter 1170, or any suitable selectable parameter 1162. In some embodiments, the one or more selectable parameters illustrated in FIGS. 11A and 11B can be received at block 1050. The initiated financial transaction can be executed based on the received user selection of the at least one selectable parameter. The initiated financial transaction can be executed using any suitable method.

While portions of this disclosure have been described with reference to a financial institution, this should not limit the scope of the claims appended herewith, as the present subject matter may find utility in many different instances where it is necessary to interface with financial information or execute a financial transaction request.

The present disclosure may be implemented by a general purpose computer or server programmed in accordance with the principals discussed herein. It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

Embodiments of the subject matter and the functional operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer program products, i.e., one or more modules of computer program instructions encoded on a transitory or non-transitory, tangible program carrier for execution by, or to control the operation of, a data processing apparatus. The non-transitory, tangible program carrier may be a computer readable storage medium. As discussed above, the computer readable storage medium may be a machine-readable storage device, a machine-readable storage substrate, a memory device, or a combination of one or more of them.

The term "processor" encompasses all apparatus, devices, and machines for processing data, including by way of example a programmable processor, a computer, server, or multiple processors, computers or servers. These apparatus, devices and machines may include (in addition to hardware) code that creates an execution environment for the computer program in question, e.g., code that constitutes processor firmware, a protocol stack, a database management system, an operating system, or a combination of one or more of them.

A computer program (also known as a program, software, software application, script, or code) may be written in any form of programming language, including compiled or interpreted languages, or declarative or procedural languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by and/or implemented as special purpose logic circuitry, e.g., a field programmable gate array (FPGA) or an application specific integrated circuit (ASIC). These processors and/or circuitry may be resident on an exemplary device described above or on servers in an exemplary banking system.

Figure 12:
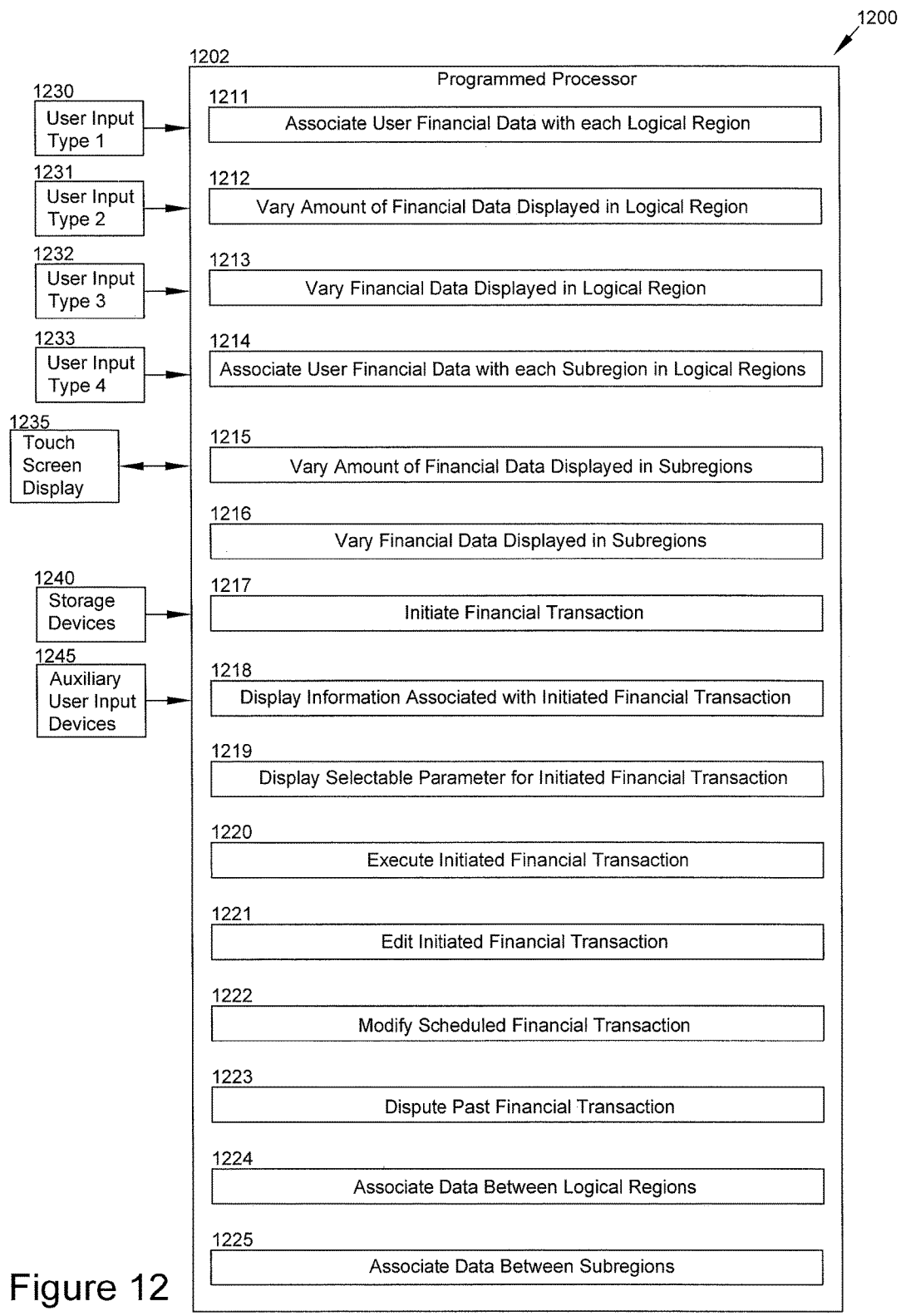
FIG. 12 is a block diagram of a processing system according to an embodiment of the present disclosure.

For example, and referring now to FIG. 12, a block diagram of a processing system according to an embodiment of the present disclosure is provided. For example, FIG. 12 shows a processor 1202 programmed to perform the method steps. The steps can be performed by a plurality of separate computer programs, or by a program that prompts the user for additional inputs between and/or during steps. These steps can include one or more of the associating user financial data with each logical region on the display 1211, varying an amount of financial data displayed in logical regions of the display 1212, varying financial data displayed logical regions on the display 1213, associating user financial data with each subregion in a logical region of the display 1214, varying an amount of financial data displayed in logical subregions of the display 1215, varying financial data displayed in logical subregions on the display 1216, initiating financial transaction 1217; displaying information associated with initiated financial transaction 1218, displaying selectable parameters for initiated financial transaction 1219, execute initiated financial transaction 1220, edit initiated financial transaction 1221, modify scheduled financial transactions 1222, dispute past financial transactions 1223, associating data between logical regions of the display 1224, and associating data between logical subregions of the display 1225. In some embodiments, these steps can include one or more of the assigning a selected portion as an initiating portion, assigning a selected portion as a receiving portion, evaluating whether selected portions are compatible, evaluating whether selected portions are suitable for a transaction, rejecting an initiated financial transaction, and initiating a financial transaction automatically. As shown in FIG. 12, user input types 1230-1233 can be received by programmed processor 1202. In some embodiments, all numerically intensive calculations are performed by a programmed processor. Although FIG. 12 shows a single processor, in other embodiments, various subsets of the processes 1211-1225 can be executed on a plurality of programmed processors, which can optionally be connected to each other by a communications network, such as a personal area network, a local area network, a wide area network, and/or the Internet.

Processors suitable for the execution of a computer program include, by way of example, both general and special purpose microprocessors, and any one or more processors of any kind of digital computer. Generally, a processor will receive instructions and data from a read only memory or a random access memory or both. While the essential elements of a computer are a processor for performing instructions and one or more data memory devices for storing instructions and data, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet, a smart phone, a mobile telephone, a personal digital assistant (PDA), a mobile audio or video player, a game console, to name just a few.

Computer readable storage media suitable for storing computer program instructions and data include all forms data memory including non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the subject matter described in this specification may be implemented on a computer having a display device, e.g., a cathode ray tube (CRT) or liquid crystal display (LCD) monitor, for displaying information to the user and a touch screen and a keyboard and a pointing device, e.g., a mouse or a trackball, by which the user may provide input to the computer. Other kinds of devices may be used to provide for interaction with a user as well; for example, input from the user may be received in any form, including acoustic, speech, or tactile input.

As discussed above, embodiments of the subject matter described in this specification may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the subject matter described is this specification, or any combination of one or more such back end, middleware, or front end components. The components of the system may be interconnected by any form or medium of digital data communication, e.g., a communication network. Examples of communication networks include a local area network (LAN) and a wide area network (WAN), e.g., the Internet. The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the claimed subject matter, but rather as descriptions of features that may be specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

As shown by the various configurations and embodiments illustrated in FIGS. 1-12, a system and method for interfacing with financial information have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What I claim is:

1. A method of configuring an interactive user interface for intuitively executing a financial transaction request via a mobile computing device, the method comprising:
    transmitting, to the mobile computing device, the user interface for display on a touch-screen display of the mobile computing device, the user interface including:
        a first logical region having first predetermined boundaries, the first logical region being associated with one or more financial accounts associated with a user and being configured to display, responsive to receiving user input corresponding to the first logical region, one or more account subregions, each of the one or more account subregions disposed within the first logical region and associated with a corresponding financial account of the one or more financial accounts; and a second logical region having second predetermined boundaries, the second logical region non-overlapping with respect to the first logical region and being associated with transactional information of the user account and being configured to transition, responsive to receiving user input corresponding to the second logical region, between displaying a first level of transactional data having a first granularity and a second level of transaction data having a second granularity that is greater than the first granularity, the second level of transaction data comprising a plurality of transactional subregions, each of the transactional subregions being associated with a corresponding future transaction;

receiving, via the user interface, a multi-part selection including:
  a first touch input associated with selection of an account subregion of the one or more account subregions; and
  a second touch input associated with selection of a transactional subregion of the plurality of transactional subregions, each of the first and second touch inputs including a drag and drop selection, long touch selection, and/or multitouch selection; and responsive to determining that the received multi-part selection is indicative of the financial transaction request, initiating, via a processor, a financial transaction from the financial account associated with the selected account subregion and for the future transaction associated with the selected transactional subregion.

2. The method of claim 1, further comprising:
displaying information associated with the initiated financial transaction on the touch-screen display based on the received multi-part selection,
wherein the displayed information includes data associated with the financial account associated with the selected account subregion and the future transaction associated with the selected transactional subregion.

3. The method of claim 1, further comprising:
displaying at least one selectable parameter for the initiated financial transaction based on the received multi-part selection, the selected account subregion, and future transaction associated with the selected transactional subregion.

4. The method of claim 3, wherein the at least one selectable parameter is selected from the group consisting of an amount of the transaction, a date of the transaction, an account associated with the transaction, a recurrence for the transaction, a payee identifier, a payee address, a text box for instructions associated with the transaction, a credit card associated with the transaction, a check associated with the transaction, and a confirmation of information associated with the transaction.

5. The method of claim 3, further comprising:
receiving a selection of the at least one selectable parameter; and
executing, via the processor, the initiated financial transaction based on the received selection of the at least one selectable parameter.

6. The method of claim 1, wherein the transactional information comprises at least one of a bill from a payee, a stock, an exchange-traded fund, a money transfer, a deposit, a mortgage, an order, a scheduled payment, a savings plan, and an investment plan.

7. The method of claim 1, further comprising:
determining, by the processor, whether the selected account subregion and the selected transactional subregion are compatible;
responsive to determining that the selected account subregion and the selected transactional subregion are compatible, initiating, by the processor, the financial transaction; and
responsive to determining that the selected account subregion and the selected transactional subregion are incompatible, rejecting, by the processor, initiation of the financial transaction.

8. The method of claim 1, further comprising:
determining, by the processor, whether the selected account subregion and the selected transactional subregion are suitable for the financial transaction;
responsive to determining that the selected account subregion and the selected transactional subregion are suitable for the financial transaction, initiating, by the processor, the financial transaction; and
responsive to determining that the selected account subregion and the selected transactional subregion are unsuitable for the financial transaction, rejecting, by the processor, initiation of the financial transaction.

9. The method of claim 1 further comprising:
prior to initiating the financial transaction, requesting, by the processor, confirmation that the received multi-part selection is indicative of a request for the financial transaction.

10. The method of claim 1 further comprising:
associating past transactional information of the user with a third logical region having third predetermined boundaries on the touch screen display, wherein the respective predetermined boundaries of the first, second, and third logical regions do not overlap with each other.

11. The method of claim 1, wherein the respective predetermined boundaries of the first and second logical regions are expandable.

12. The method of claim 1, wherein a type of user input comprises an open pinch being associated with more specific information and a closed pinch being associated with more general information.

13. A method of configuring an interactive user interface for intuitively executing a financial transaction request via a mobile computing device, the method comprising:
transmitting, to the mobile computing device, the user interface for display on a touch-screen display of the mobile computing device, the interface including:
  a first logical region having first predetermined boundaries, the first logical region being associated with account information of a user account and being configured to expand, responsive to receiving user input corresponding to the first logical region, to display an increased portion of the account information;
  a second logical region having second predetermined boundaries, the second logical region non-overlapping with respect to the first logical region and being associated with transactional information of the user account and being configured to expand, responsive to receiving user input corresponding to the second logical region, to display an increased portion of the transactional information;

a first logical subregion having third predetermined boundaries within the first logical region, the first logical subregion being associated with a first subset of the increased portion of the account information; and a second logical subregion having fourth predetermined boundaries within the first logical region, the second logical subregion being associated with a second subset of the increased portion of the account information;

receiving a multi-part selection including:

receiving, via the user interface, input associated with selection of a portion of the account information in each of the first and second logical subregions, the input including a drag and drop selection, long touch selection, and/or multitouch selection; and responsive to determining that the received multi-part selection is indicative of the financial transaction request, initiating, via a processor, a financial transaction corresponding to data associated with the first logical subregion and the second logical subregion.

14. The method of claim 13, further comprising:
displaying information associated with the initiated financial transaction on the touch-screen display based on the received multi-part selection,
wherein the displayed information includes data associated with the first and second logical subregions.

15. The method of claim 13, further comprising:
displaying at least one selectable parameter for the initiated financial transaction based on the received multi-part selection, the first logical subregion, and the second logical subregion.

16. The method of claim 15, wherein the at least one selectable parameter is selected from the group consisting of an amount of the transaction, a date of the transaction, a recurrence for the transaction, a text box for instructions associated with the transaction, and a confirmation of information associated with the transaction.

17. The method of claim 15, further comprising:
receiving a user's selection of the at least one selectable parameter; and
executing, via the processor, the initiated financial transaction based on the received selection of the at least one selectable parameter.

18. The method of claim 13, wherein the respective account information of the respective first and second logical subregions comprises at least one of checking account information, savings account information, mortgage account information, brokerage account information, credit card account information, investment account information, certificate of deposit account information and retirement account information.

19. The method of claim 13, further comprising:
determining, by the processor, whether the selected portion of the account information in the first logical subregion and the selected portion of the account information in the second logical subregion are compatible;
responsive to determining that the selected portion of the account information in the first logical subregion and the selected portion of the account information in the second logical subregion are compatible, initiating, by the processor, the financial transaction; and
responsive to determining that the selected portion of the account information in the first logical subregion and the selected portion of the account information in the second logical subregion are incompatible, rejecting, by the processor, initiation of the financial transaction.

20. The method of claim 13, further comprising:
determining, by the processor, whether the selected portion of the account information in the first logical subregion and the selected portion of the account information in the second logical subregion are suitable for the financial transaction;
responsive to determining that the selected portion of the account information in the first logical subregion and the selected portion of the account information in the second logical subregion are suitable for the financial transaction, initiating, by the processor, the financial transaction; and
responsive to determining that the selected portion of the account information in the first logical subregion and the selected portion of the account information in the second logical subregion are suitable for the financial transaction, rejecting, by the processor, initiation of the financial transaction.

21. The method of claim 13, wherein the selected portion of the account information in the first logical subregion comprises all account information displayed in the first logical region.

22. The method of claim 13, wherein the selected portion of the transactional information in the second logical subregion comprises all transactional information displayed in the second logical region.

23. The method of claim 13, wherein the account information of the first logical region is expandable, based on a type of user input via the touch screen, between more general account information and more specific account information, and wherein the transactional information of the second logical region is expandable, based on a type of user input via the touch screen, between more general transactional information and more specific transaction information.

24. The method of claim 23, wherein the type of user input comprises an open pinch being associated with more specific information and a closed pinch being associated with more general information.

* * * * *